(12) United States Patent
Collins

(10) Patent No.: US 12,246,272 B2
(45) Date of Patent: Mar. 11, 2025

(54) WASTEWATER FILTERS AND WASTEWATER FILTRATION SYSTEMS SPECIFICALLY ADAPTED FOR THEIR USE

(71) Applicants: Thomas E. Frankel, Poughkeepsie, NY (US); Seoungil Kang, Poughkeepsie, NY (US); Todd D. Ritter, Poughkeepsie, NY (US)

(72) Inventor: Anthony W. Collins, Mansfield (GB)

( * ) Notice: Subject to any disclaimer, the term of this patent is extended or adjusted under 35 U.S.C. 154(b) by 618 days.

(21) Appl. No.: 17/453,593

(22) Filed: Nov. 4, 2021

(65) Prior Publication Data

US 2023/0136410 A1 May 4, 2023

(51) Int. Cl.
| | | |
|---|---|---|
| *B01D 29/68* | (2006.01) | |
| *B01D 29/05* | (2006.01) | |
| *B01D 29/58* | (2006.01) | |
| *B01D 35/027* | (2006.01) | |
| *B01D 35/30* | (2006.01) | |

(52) U.S. Cl.
CPC ............. *B01D 29/68* (2013.01); *B01D 29/05* (2013.01); *B01D 29/58* (2013.01); *B01D 35/027* (2013.01); *B01D 35/30* (2013.01); *B01D 2201/084* (2013.01)

(58) Field of Classification Search
CPC ........ B01D 29/68; B01D 29/05; B01D 29/58; B01D 35/027; B01D 35/30; B01D 2201/084; B01D 29/39; Y02W 10/10
See application file for complete search history.

(56) References Cited

U.S. PATENT DOCUMENTS

| | | | |
|---|---|---|---|
| 1,381,944 | A | 6/1921 | Sweetland |
| 1,833,315 | A | 11/1931 | Burhans |
| 2,780,364 | A | 2/1957 | Teatini |
| 3,231,490 | A | 1/1966 | Fry |
| 3,617,541 | A | 11/1971 | Pan |
| 4,090,965 | A | 5/1978 | Fuchs |
| 4,167,482 | A | 9/1979 | Muller |
| 4,219,420 | A | 8/1980 | Muller |
| 4,439,323 | A | 3/1984 | Ball |

(Continued)

FOREIGN PATENT DOCUMENTS

| | | | | |
|---|---|---|---|---|
| CN | 106457089 A | * | 2/2017 | .......... B01D 29/012 |
| KR | 20100051068 A | * | 5/2010 | |

(Continued)

*Primary Examiner* — Waqaas Ali
(74) *Attorney, Agent, or Firm* — LAW OFFICES OF MICHAEL L. WISE, LLC

(57) ABSTRACT

A wastewater filter cartridge includes a peripheral frame, two filter media sheets, two sets of angled fins, and a filtered water outlet. The two filter media sheets are attached to the peripheral frame in spaced face-to-face relation such that they combine with the peripheral frame to define an interior volume within the filter cartridge. At the same time, the two sets of angled fins are attached to the peripheral frame external to the interior volume and project away from the filter media sheets at oblique angles. As wastewater passes through the two filter media sheets into the interior of the filter cartridge, the two filter media sheets act to reduce the suspended solids in the wastewater. Once in the interior volume of the filter cartridge, the filtered water is collected via the filtered water outlet, which is connected to the interior volume.

22 Claims, 17 Drawing Sheets

(56) References Cited

U.S. PATENT DOCUMENTS

| | | | |
|---|---|---|---|
| 4,639,315 | A | 1/1987 | Fuchs et al. |
| 4,725,292 | A | 2/1988 | Williams |
| 4,869,823 | A | 9/1989 | Otani et al. |
| 5,374,360 | A | 12/1994 | Weis |
| 5,480,561 | A | 1/1996 | Ball et al. |
| 5,560,835 | A | 10/1996 | Williams |
| 5,639,371 | A | 6/1997 | Loy et al. |
| 5,698,102 | A | 12/1997 | Khudenko |
| 5,811,011 | A | 9/1998 | Ciszczon et al. |
| 5,876,612 | A | 3/1999 | Astrom |
| 6,029,479 | A | 2/2000 | Pattee |
| 6,090,298 | A | 7/2000 | Weis |
| 6,103,132 | A | 8/2000 | Seyfried |
| 6,294,098 | B1 | 9/2001 | Bergmann |
| 6,505,744 | B1 | 1/2003 | Geaugey et al. |
| 6,540,920 | B2 | 4/2003 | Bounds et al. |
| 6,776,295 | B2 | 8/2004 | Morimura |
| 6,858,140 | B2 | 2/2005 | Smith et al. |
| 7,323,108 | B1 | 1/2008 | Garbett et al. |
| 7,537,689 | B2 | 5/2009 | Ricketts |
| 7,572,383 | B2 | 8/2009 | Dew, Jr. |
| 8,734,641 | B2 | 5/2014 | Collins |
| 2005/0139557 | A1 | 6/2005 | Ricketts |
| 2012/0055858 | A1* | 3/2012 | Collins ............... B01D 29/39 210/121 |

FOREIGN PATENT DOCUMENTS

| | | |
|---|---|---|
| KR | 101039326 B1 * | 6/2011 |
| NL | 8103750 A | 3/1983 |
| SU | 858879 A1 | 8/1981 |

\* cited by examiner

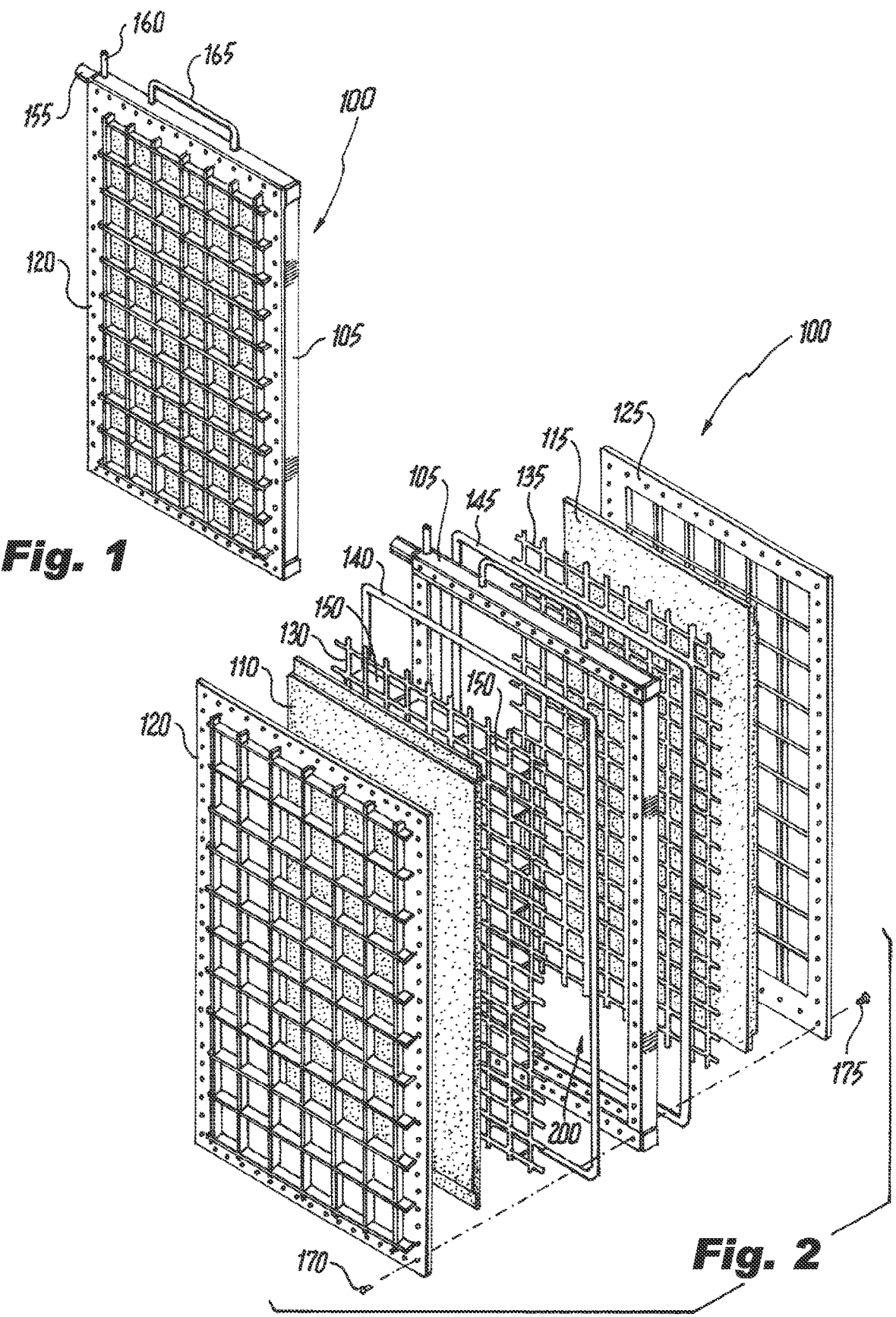

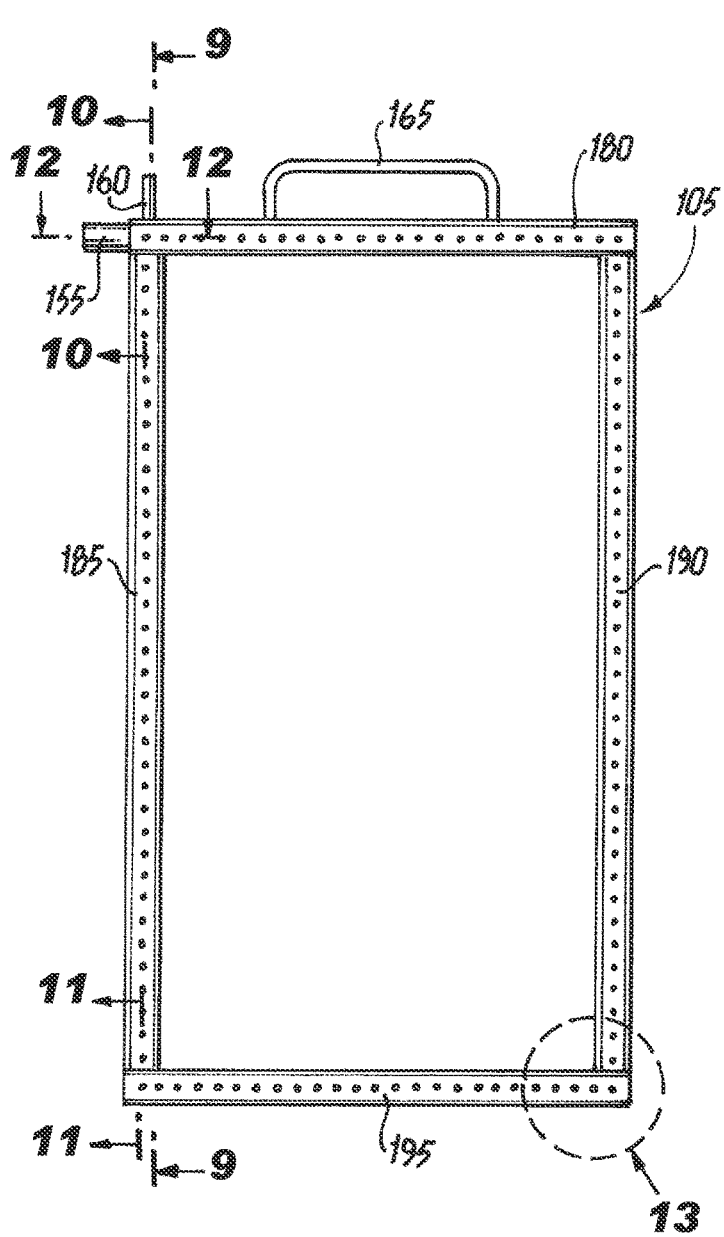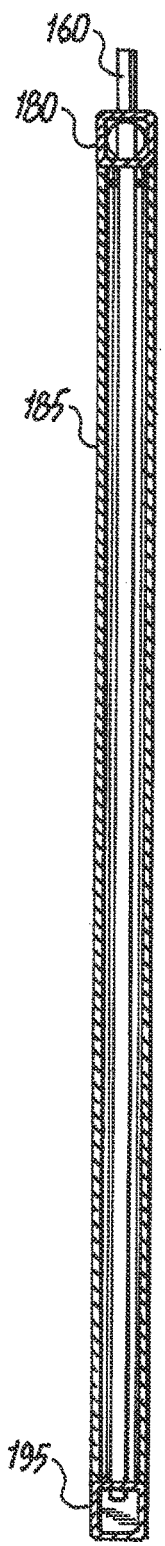
Fig. 8
Fig. 9

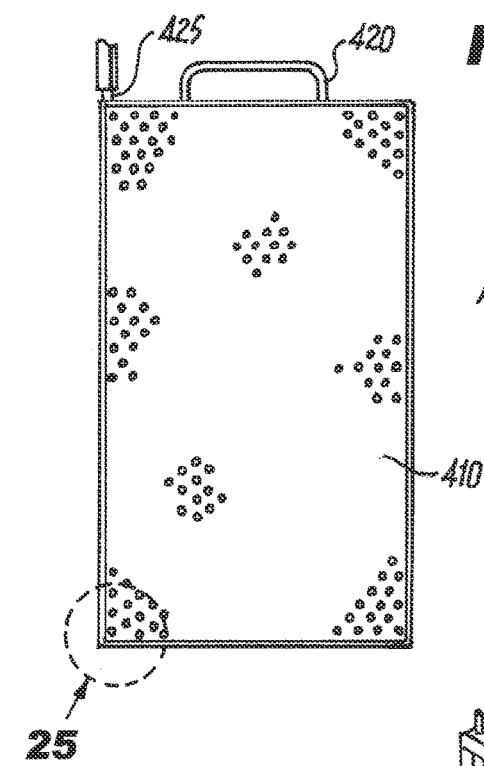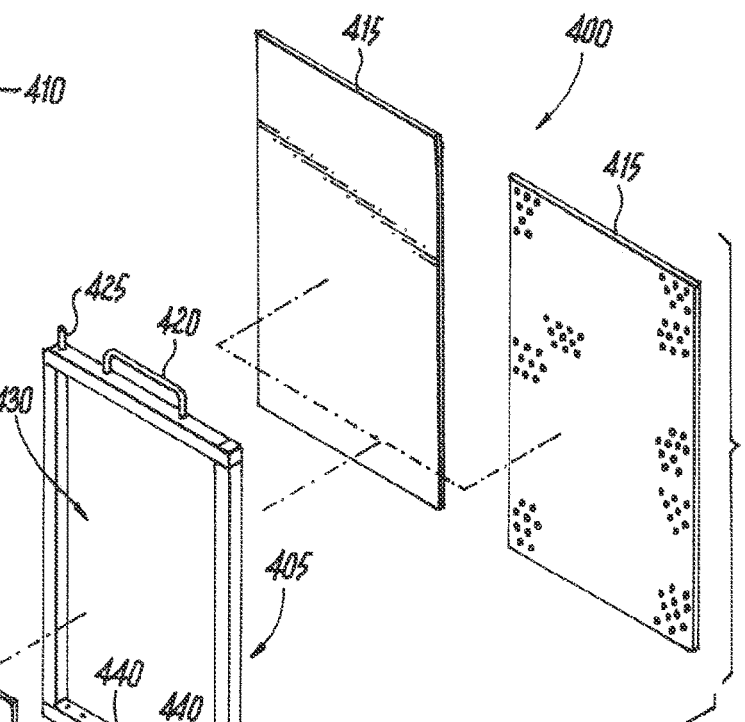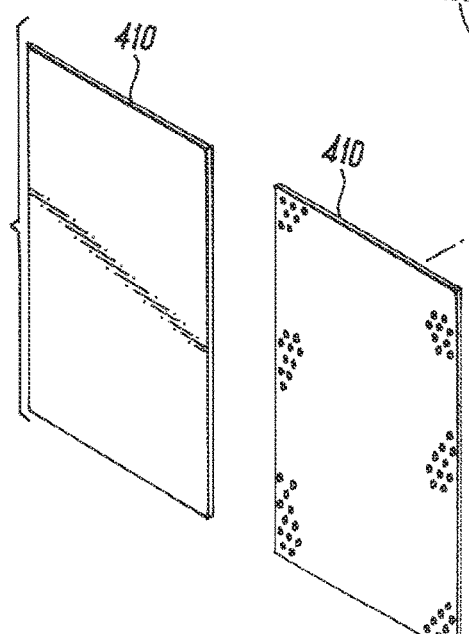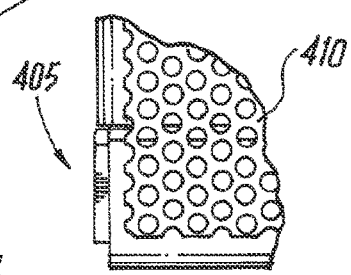
Fig. 23
Fig. 24
Fig. 25

WASTEWATER FILTERS AND WASTEWATER FILTRATION SYSTEMS SPECIFICALLY ADAPTED FOR THEIR USE

FIELD OF THE INVENTION

The present invention relates generally to wastewater treatment, and, more particularly, to filters and associated wastewater filtration systems for use in removing suspended solids from wastewater.

BACKGROUND OF THE INVENTION

Modern wastewater treatment involves three stages, namely, primary, secondary, and tertiary treatment. Primary treatment generally involves temporary retention of the wastewater in a basin to allow heavy solids to settle to the bottom while oil, grease, and lighter solids float to the surface. Settled and floating substances are removed and the remaining liquid is subjected to secondary treatment. The secondary treatment stage degrades the biological content of the wastewater. The majority of municipal wastewater treatment plants treat the settled wastewater using aerobic biological processes to remove dissolved and suspended biological matter. Biological treated waters flow to a secondary sedimentation stage for clarification. Tertiary treatment involves final treatment stages that raise the effluent quality prior to discharge to the receiving environment.

Tertiary filters may utilize porous media filters, such as woven fabric, knitted fabric, gauze, mesh, penetrable membranes, etc. However, over time filtered particles accumulate on the filter media to a level that degrades the effectiveness of the filter. A cleaning process (i.e., a "backwashing" process) is required to restore filter effectiveness by cleaning the filter media.

Systems intended to periodically clean the filter media by removal of accumulated solids typically utilize a vacuum pump to create suction for vacuum heads to remove captured solids from the media. Nevertheless, these suction-based designs may suffer from several disadvantages. Turbidity spikes may be experienced during and after a suction-based backwashing process due to the "overcleaning" of the external surfaces of the filters. Perhaps somewhat counterintuitively, accumulated solids on a filter can actually help to raise filtration efficiency when present at low to moderate levels. As a result, overcleaning the surfaces of a filter can reduce filtration efficiency. In addition, the application of an external suction force on the outer surface of a filter may reduce the internal pressure in the filter, artificially increasing the flow of wastewater through the filter to a level that can also reduce filtration efficiency. The vacuum cleaning heads, moreover, take up a great deal of space, thereby limiting the number of filters area per tank. In addition, such systems require substantial energy consumption to power the vacuum cleaning system.

Accordingly, there exists a need for improved tertiary media filtration systems with backwashing capabilities that avoid the limitations and disadvantages set forth above.

SUMMARY OF THE INVENTION

Embodiments of the present invention address the above-identified needs by providing filters and associated wastewater filtration systems that address the above-identified deficiencies. These filters and systems are specifically designed to allow the filters to be cleaned in situ without creating turbidity spikes or otherwise adversely affecting filtration efficiency.

Aspects of the invention are directed to an apparatus comprising: a peripheral frame, a first filter media sheet, a second filter media sheet, a plurality of first angled fins, a plurality of second angled fins, and a filtered water outlet. The first filter media sheet is attached to the peripheral frame. The second filter media sheet is attached to the peripheral frame in spaced face-to-face relation to the first filter media sheet such that the peripheral frame, the first filter media sheet, and the second filter media sheet combine to define a filter interior volume. So configured, the first filter media sheet has a first exterior media surface facing away from the filter interior volume and a first interior media surface facing towards the filter interior volume, while the second filter media sheet has a second exterior media surface facing away from the filter interior volume and a second interior media surface facing towards the filter interior volume. The plurality of first angled fins are attached to the peripheral frame external to the filter interior volume and project away from the first exterior media surface at an oblique angle. Likewise, the plurality of second angled fins are attached to the peripheral frame external to the filter interior volume and project away from the second exterior media surface at an oblique angle. The filtered water outlet is in fluid communication with the filter interior volume.

Additional aspects of the invention are directed to an apparatus comprising: a wastewater treatment tank, wastewater in the wastewater treatment tank, and a filter cartage mounted in the wastewater treatment tank and submersed in the wastewater. The filter cartridge comprises: a peripheral frame, a first filter media sheet, a second filter media sheet, a plurality of first angled fins, a plurality of second angled fins, and a filtered water outlet. The first filter media sheet is attached to the peripheral frame. The second filter media sheet is attached to the peripheral frame in spaced face-to-face relation to the first filter media sheet such that the peripheral frame, the first filter media sheet, and the second filter media sheet combine to define a filter interior volume. So configured, the first filter media sheet has a first exterior media surface facing away from the filter interior volume and a first interior media surface facing towards the filter interior volume, while the second filter media sheet has a second exterior media surface facing away from the filter interior volume and a second interior media surface facing towards the filter interior volume. The plurality of first angled fins are attached to the peripheral frame external to the filter interior volume and project away from the first exterior media surface at an oblique angle. Likewise, the plurality of second angled fins are attached to the peripheral frame external to the filter interior volume and project away from the second exterior media surface at an oblique angle. The filtered water outlet is in fluid communication with the filter interior volume.

BRIEF DESCRIPTION OF THE DRAWINGS

These and other features, aspects, and advantages of the present invention will become better understood with regard to the following description, appended claims, and accompanying drawings where:

FIG. 1 shows a perspective view of a filter cartridge in accordance with an illustrative embodiment of the invention;

FIG. 2 shows an exploded perspective view of the FIG. 1 filter cartridge;

FIG. 8 shows an elevational view of a peripheral frame, a filtered water outlet, and a purging fluid inlet in the FIG. 1 filter cartridge;

FIGS. 9-12 show sectional views of the FIG. 8 elements along the respective cleave planes indicated in FIG. 8;

FIG. 23 shows an elevational view of a spray panel in accordance with an illustrative embodiment of the invention;

FIG. 24 shows an exploded perspective view of the FIG. 23 spray panel;

FIG. 25 shows an elevational view of the FIG. 23 spray panel in the region indicated in FIG. 23;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein and in the appended claims, a first element is "attached" to a second element if the first element is physically connected to the second element directly or through one or more solid (i.e., not liquid or gas) intermediate elements. Moreover, a first element "overlies" a second element if the first element is covering at least a portion of the second element and is in direct contact with the second element. "Proximate means" within twelve inches. An object is mounted at an "oblique angle with respect to the Earth" if it is mounted so as to be neither parallel to, nor at a right angle to, the local gravitational field lines of the Earth.

Aspects of a filter cartridge 100 (a form of apparatus) in accordance with an illustrative embodiment of the invention are now described. The filter cartridge 100 may be used in the tertiary filtration of wastewater, that is, in the final or near-final treatment of the wastewater to raise the water quality prior to discharge to the receiving environment. In a given application, for example, the filter cartridge 100 will see incoming wastewater with a water quality of about 60 parts-per-million of total suspended solids (ppm TSS). The filter cartridge 100 may be used to help achieve a water quality of, as just an example, less than 5 ppm TSS.

Figure 3:
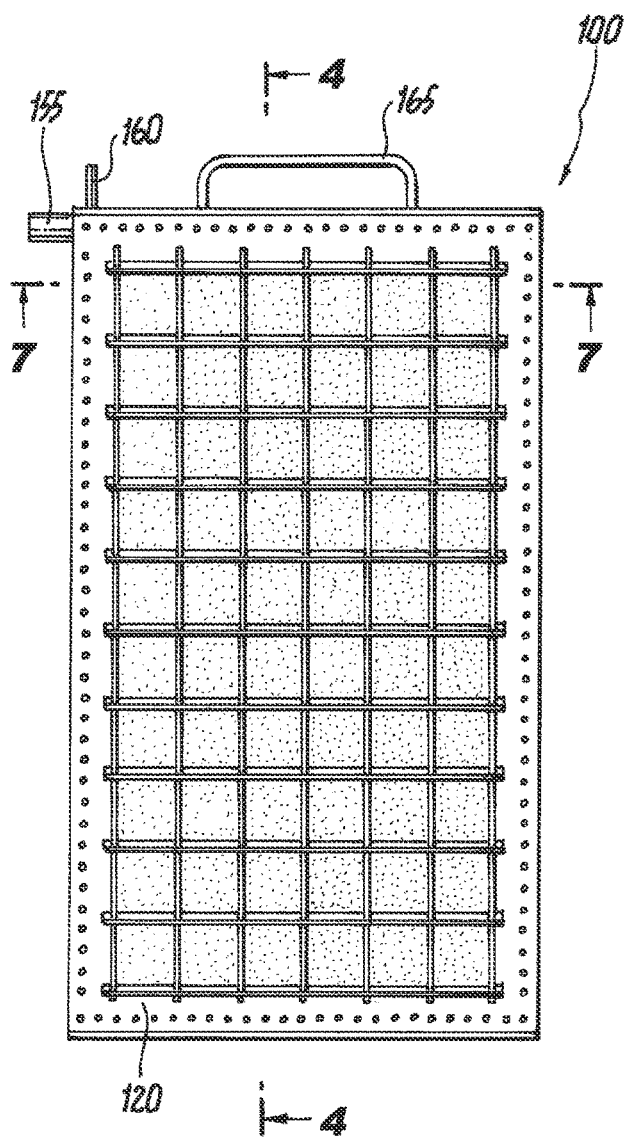
FIG. 3 shows an elevational view of the FIG. 1 filter cartridge.

FIG. 1 shows a perspective view of the filter cartridge 100, FIG. 2 shows an exploded perspective view of the filter cartridge 100, and FIG. 3 shows an elevational view of the filter cartridge 100. Externally, it can be discerned that the filter cartridge 100 comprises: a peripheral frame 105, a first filter media sheet 110, a second filter media sheet 115, a first fin assembly 120, a second fin assembly 125, a first inner mesh 130, a second inner mesh 135, a first cartridge gasket 140, a second cartridge gasket 145, internal baffles 150, a filtered water outlet 155, a purging fluid inlet 160, a handle 165, first screws 170, and second screws 175. The peripheral frame comprises a first member 180, a second member 185, a third member 190, and a fourth member 195 arranged as a rectangle (i.e., a form of quadrilateral). When assembled, the first fin assembly 120 overlies the first filter media sheet 110, which overlies the first inner mesh 130. These first elements are mounted to one face of the peripheral frame 105 via the first cartridge gasket 140 and the first screws 170. At the same time, the second fin assembly 125 overlies the second filter media sheet 115, which overlies the second inner mesh 135, and these second elements are mounted to a second, opposite face of the peripheral frame 105 via the second cartridge gasket 145 and the second screws 175. The second elements are thereby in a spaced face-to-face relation to the first elements on opposite sides of the peripheral frame 105. In this manner, the peripheral frame 105, the first filter media sheet 110, and the second filter media sheet 115 combine to define a filter interior volume 200. The internal baffles 150 span between the first inner mesh 130 and the second inner mesh 135 inside the filter interior volume 200.

Figure 4:
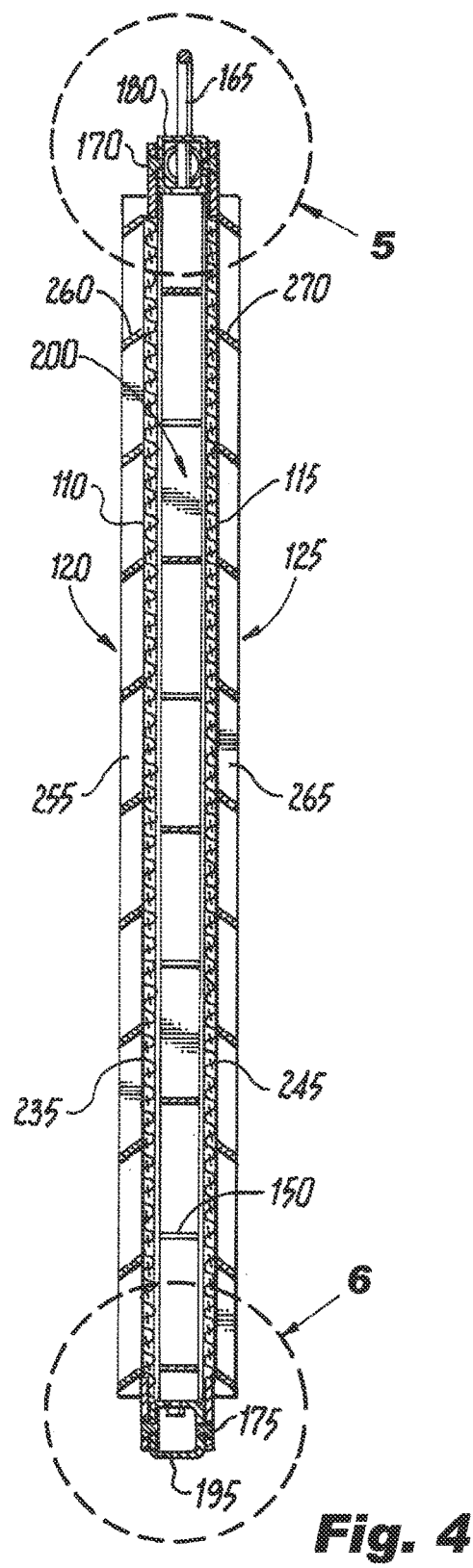
FIG. 4 shows a sectional view of the FIG. 1 filter cartridge along the cleave plane indicated in FIG. 3.
Figure 5:
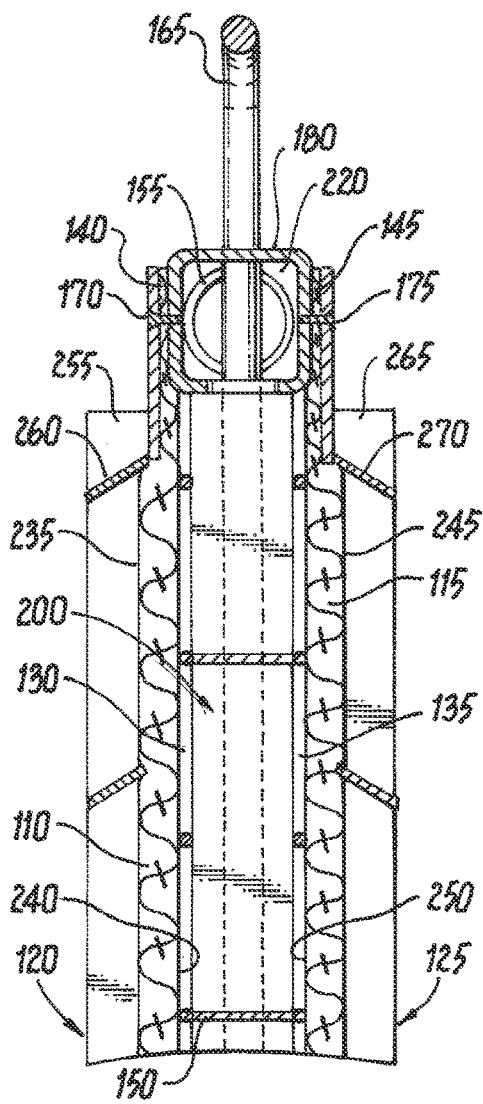
FIGS. 5 and 6 show sectional views of the FIG. 1 filter cartridge in the respective regions indicated in FIG. 4.
Figure 6:
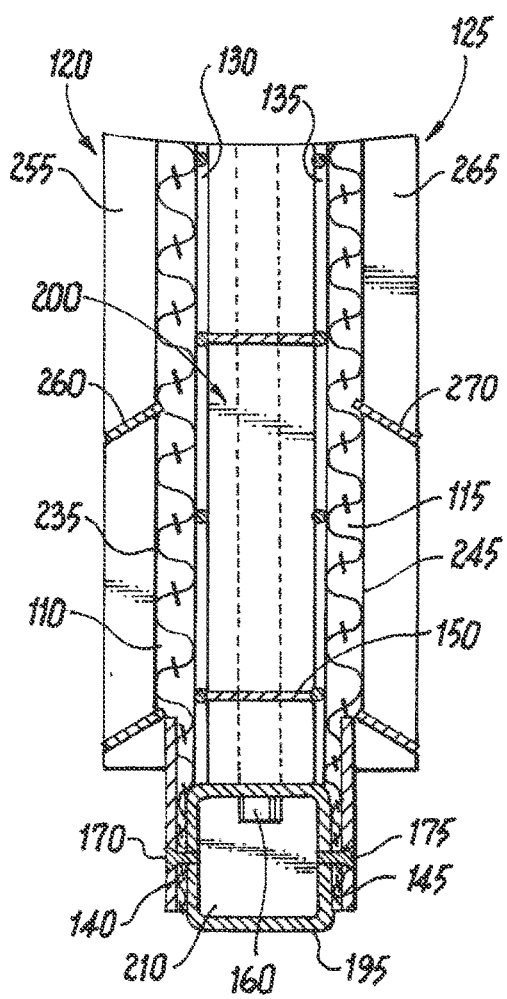
Figure 7:
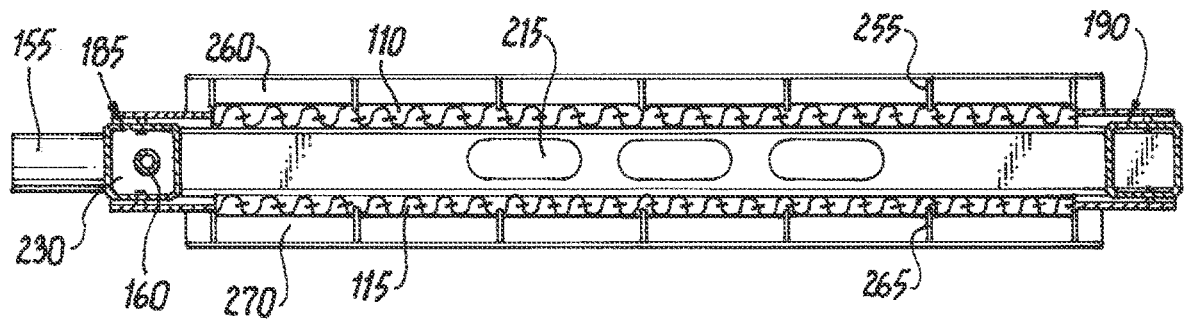
FIG. 7 shows a sectional view of the FIG. 1 filter cartridge along the cleave plane indicated in FIG. 3.
Figure 10:
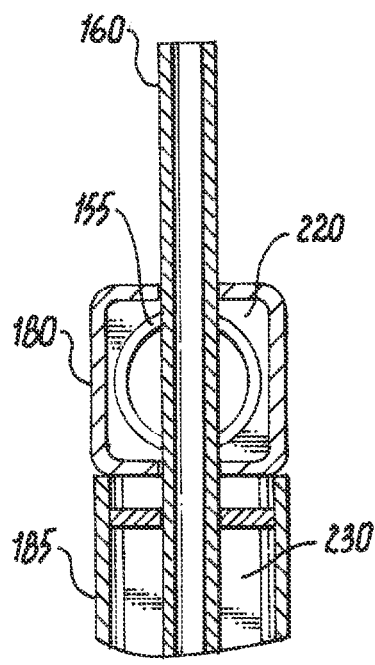
Figure 11:
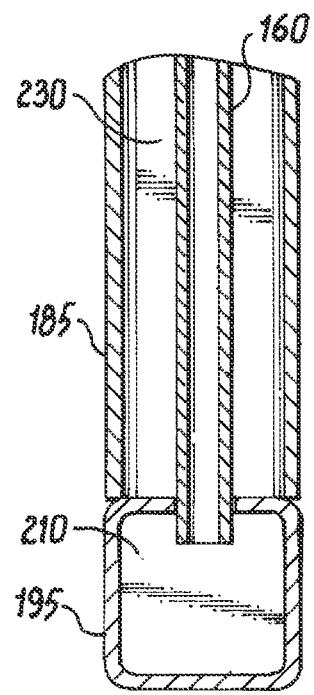
Figure 12:
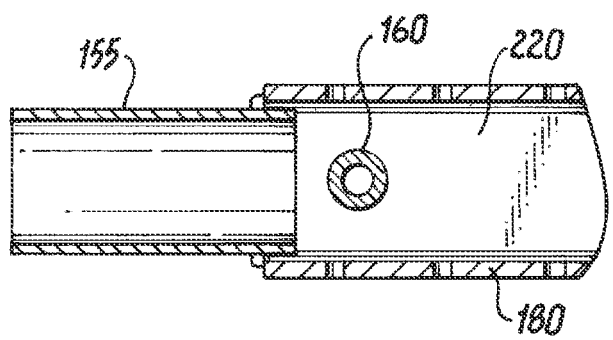
Figure 13:
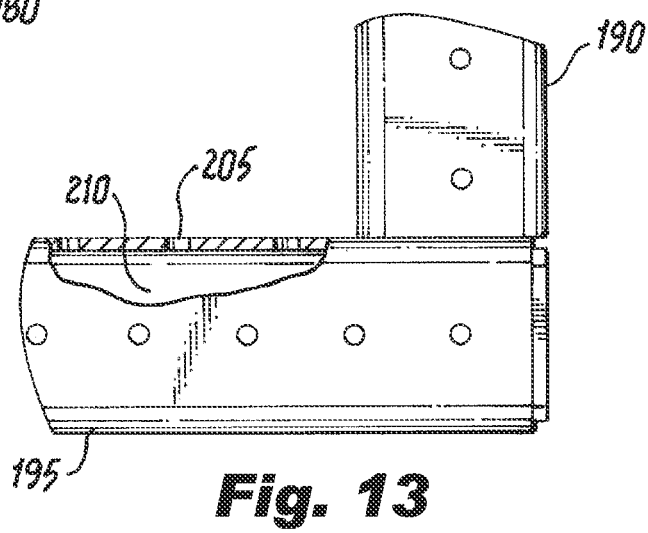
FIG. 13 shows a partially-broken elevational view of the FIG. 8 peripheral frame in the region indicated in FIG. 8.

Additional details of the filter cartridge 100 are shown in FIGS. 4-13, where: FIG. 4 shows a sectional view of the filter cartridge 100 along the cleave plane indicated in FIG. 3; FIGS. 5 and 6 show sectional views of the filter cartridge 100 in the respective regions indicated in FIG. 4; FIG. 7 shows a sectional view of the filter cartridge 100 along the cleave plane indicated in FIG. 3; FIG. 8 shows an elevational view of the peripheral frame 105, the filtered water outlet 155, and the purging fluid inlet 160 in the filter cartridge 100; FIGS. 9-12 show sectional views of the FIG. 8 elements along the respective cleave planes indicated in FIG. 8; and FIG. 13 shows a partially-broken elevational view of the peripheral frame 105 in the region indicated in FIG. 8.

It will be noted that the first member 180, the second member 185, the third member 190, and the fourth member 195 are formed of hollow square-tubular tubes with end plugs placed as necessary to isolate the interiors of the members 180, 185, 190, 195 from the outside environment. The fourth member 195 defines purging fluid openings 205 that provide fluid communication between an interior of the fourth member 195 (hereinafter, the fourth member interior volume 210) and the filter interior volume 200. In the present illustrative embodiment, the purging fluid openings 205 are in the form of numerous holes in the fourth member 195 that face the filter interior volume 200. Likewise, the first member 180 defines filtered water openings 215 that provide fluid communication between an interior of the first member 180 (hereinafter, the first member interior volume 220) and the filter interior volume 200. Here, however, the filtered water openings 215 are in the form of elongate slots in the first member 180 that face the filter interior volume 200.

The filtered water outlet 155 projects laterally from the first member 180 and is in fluid communication with the first member interior volume 220. Given the presence of the filtered water openings 215, the filtered water outlet 155 is also, by extension, in fluidic communication with the filter interior volume 200. The purging fluid inlet 160, in contrast, projects from the first member 180 at a right angle to the filtered water outlet 155. The purging fluid inlet 160 passes through an interior of the second member 185 (hereinafter, the second member interior volume 230) and terminates in the fourth member interior volume 210. With the purging fluid openings 205 in the fourth member 195, the purging fluid inlet 160 is also in fluidic communication with the filter interior volume 200.

The first filter media sheet 110 defines a first exterior media surface 235 facing away from the filter interior volume 200 and a first interior media surface 240 facing towards the filter interior volume 200. Likewise, the second filter media sheet 115 defines a second exterior media surface 245 facing away from the filter interior volume 200 and a second interior media surface 250 facing towards the filter interior volume 200. The first inner mesh 130 overlies the first interior media surface 240, while the second inner mesh 135 overlies the second interior media surface 250. The internal baffles 150 are attached to the first inner mesh 130 and the second inner mesh 135 and span therebetween in the filter interior volume 200. In the present embodiment, there are gaps between the internal baffles 150 of a given row, and the internal baffles 150 are staggered row-to-row. This arrangement causes the internal baffles 150 to interfere somewhat with any fluids (liquids or gases) travelling from the fourth member 195 towards the first member 180, which will be beneficial when purging the filter cartridge 100, as detailed below.

The first fin assembly 120 and the second fin assembly 125 are largely identical. The first fin assembly 120 comprises a plurality of first straight fins 255, which are arranged perpendicular to a plurality of first angled fins 260 to form a grid. The first straight fins 255 project away from the first exterior media surface 235 at a ninety-degree angle. The first angled fins 260 project away from the first exterior media surface 235 at an oblique angle. In one or more nonlimiting embodiments, for example, the first angled fins 260 form an angle of about thirty degrees with the first exterior media surface 235. The second fin assembly 125 comprises a plurality of second straight fins 265, which are arranged perpendicular to a plurality of second angled fins 270 to form a grid. Here again, the second straight fins 265 project away from the second exterior media surface 245 at a ninety-degree angle. The second angled fins 270 project away from the second exterior media surface 245 at an oblique angle (e.g., about thirty degrees).

In one or more embodiments, the first filter media sheet 110 and the second filter media sheet 115 may be formed of commercially available pile cloth media, which may, as just an example, be about 0.4 inches in thickness when uncompressed. While pile cloth is preferred, any suitable form of woven fabric, knitted fabric, gauze, mesh, penetrable membranes, and the like would also fall within the scope of the invention. The first filter media sheet 110 may be designed to remove solids greater than five micrometers in diameter. The first cartridge gasket 140 and the second cartridge gasket 145 may be formed of an elastomeric material such as rubber. The remainder of the elements of the filter cartridge 100 may be formed of stainless steel or another suitable material (e.g., plastic). Formation of elements may be by conventional forming techniques, which will be familiar to one skilled in the art given the disclosure described herein.

Figure 14:
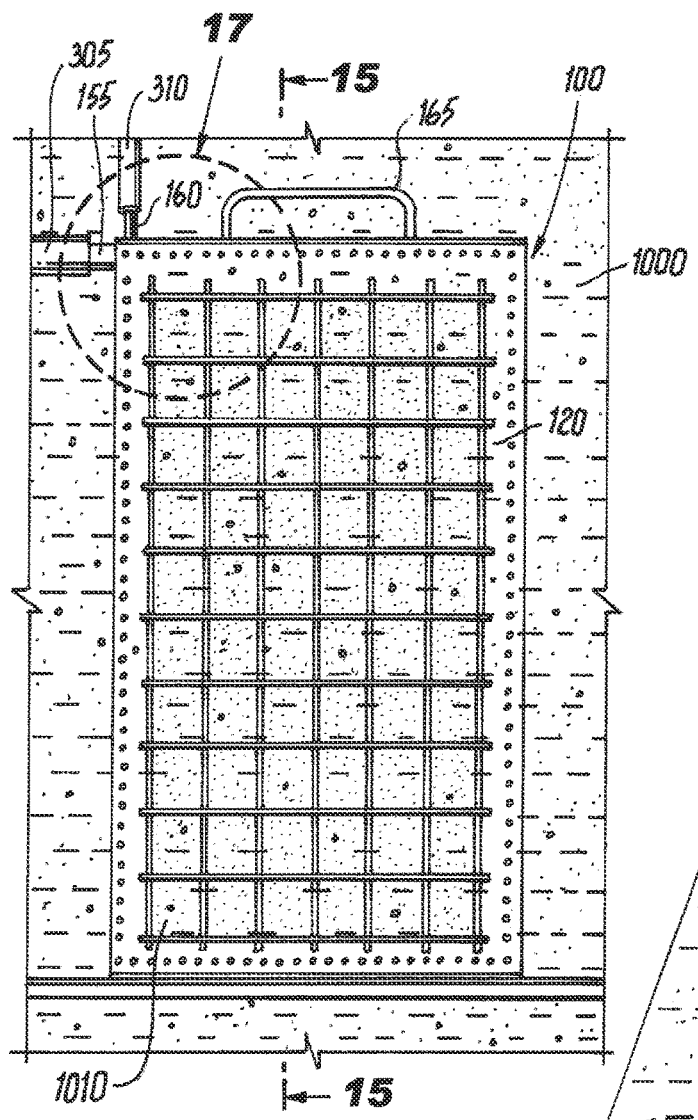
FIG. 14 shows an elevational view of the FIG. 1 filter cartridge during filtering.
Figure 15:
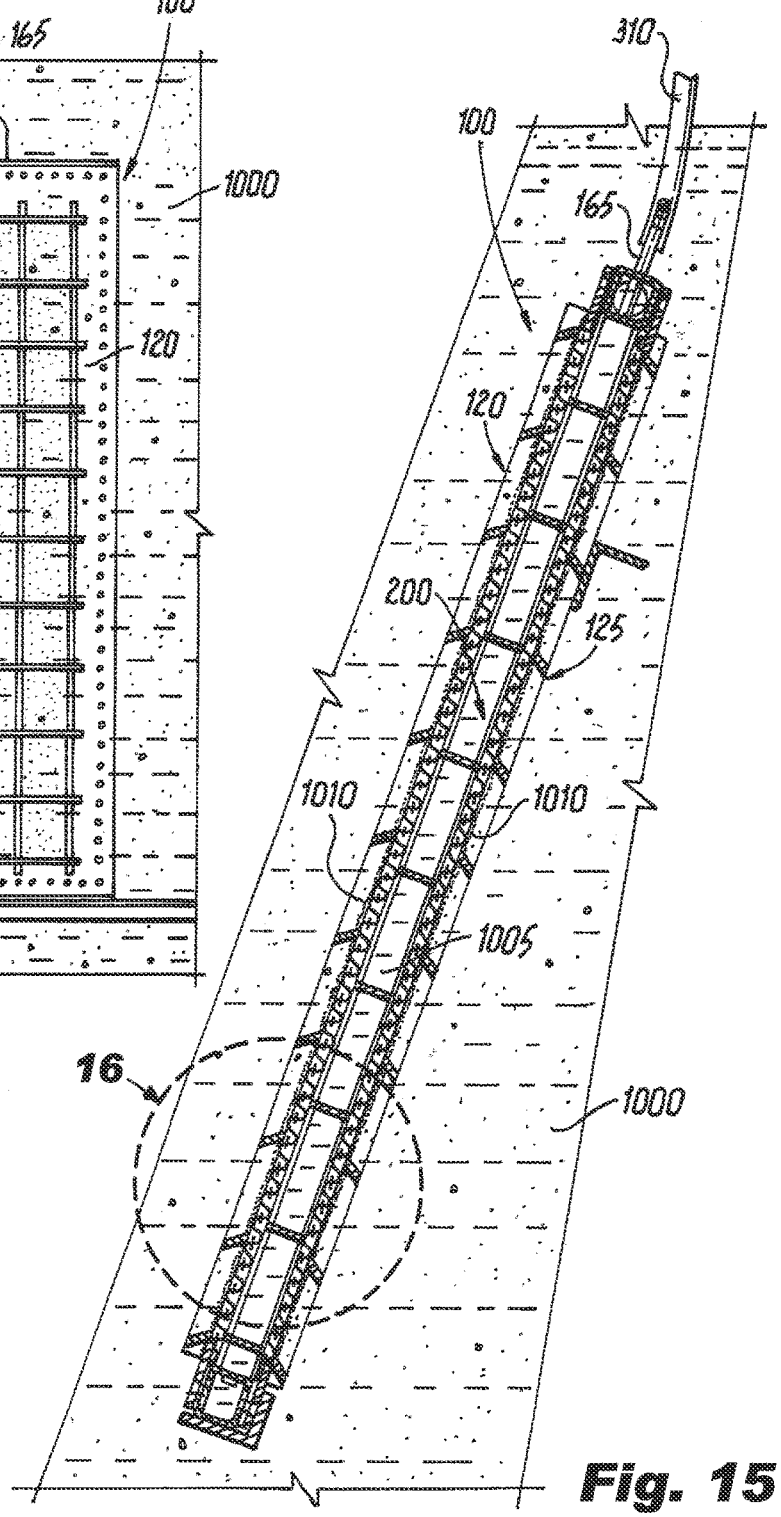
FIG. 15 shows a sectional view of the FIG. 1 filter cartridge during filtering along the cleave plane indicated in FIG. 14.
Figure 16:
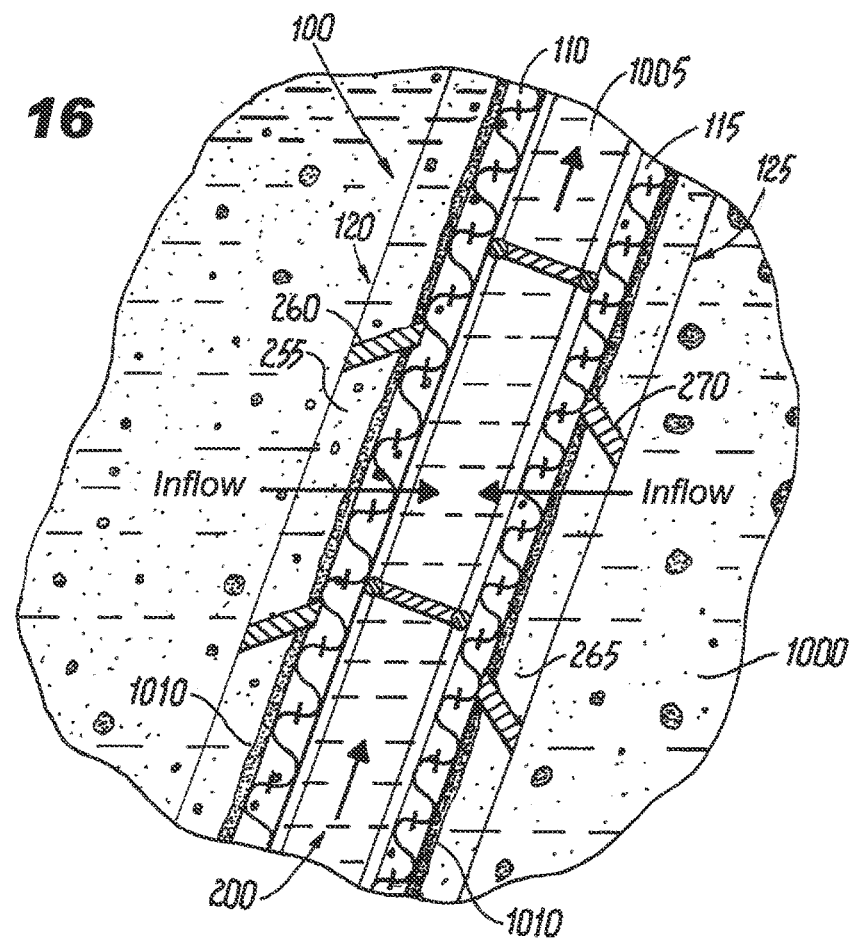
FIG. 16 shows a sectional view of the FIG. 1 filter cartridge during filtering in the region indicated in FIG. 15.
Figure 17:
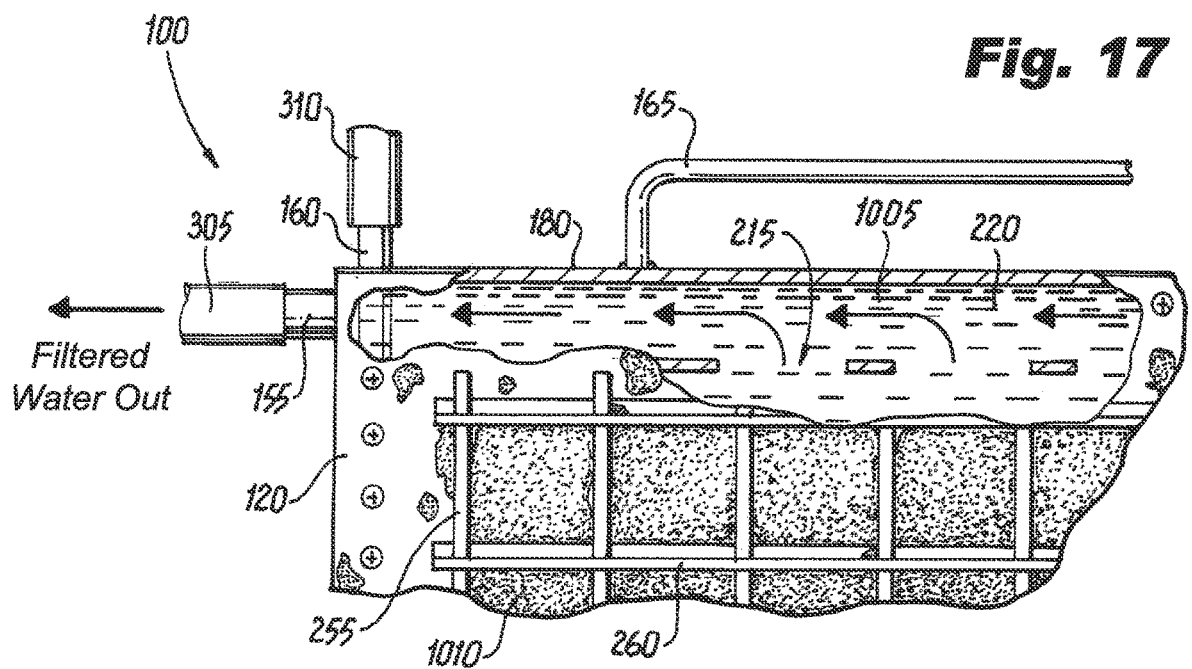
FIG. 17 shows a partially-broken elevational view of the FIG. 1 filter cartridge during filtering in the region indicated in FIG. 14.

FIGS. 14-17 show the filter cartridge 100 immersed in wastewater 1000 during active filtering, as may be the condition in a wastewater treatment tank. In these figures: FIG. 14 shows an elevational view of the filter cartridge 100 during filtering, FIG. 15 shows a sectional view of the filter cartridge 100 during filtering along the cleave plane indicated in FIG. 14, FIG. 16 shows a sectional view of the filter cartridge 100 during filtering in the region indicated in FIG. 15, and FIG. 17 shows a partially-broken elevational view of the filter cartridge 100 during filtering in the region indicated in FIG. 14. The filtered water outlet 155 is attached a filtered water hose 305 that carries the filtered water away from the filter cartridge 100. The purging fluid inlet 160 is attached to a purging fluid hose 310 that is attached to a source of purging fluid (described below).

With the filter cartridge 100 submerged in the wastewater 1000, hydrostatic pressure causes some of the wastewater 1000 to penetrate through the first filter media sheet 110 or the second filter media sheet 115 into the filter interior volume 200. In so doing, this portion of the wastewater 1000 is filtered so that a filtered portion of the wastewater 1000 (hereinafter, the filtered water 1005) has a lower solids content than the wastewater 1000 external to the filter interior volume 200. The filtered water 1005, in turn, eventually enters the first member interior volume 220 via the filtered water openings 215 and exits the filter cartridge 100 from the filtered water outlet 155 and the filtered water hose 305. Some of the solids filtered from the wastewater 1000 collect on the first filter media sheet 110, which are visible as accumulated solids 1010 in FIGS. 14-17. The filtered water 1005 can then be collected and further treated and/or reintroduced into the receiving environment.

It will be noted that the filter cartridge 100 is inclined, that is, it is oriented with the first exterior media surface 235 and the second exterior media surface 245 forming an oblique angle with respect to the Earth. Filtering by the filter cartridge 100 may be enhanced by installing the filter cartridge 100 with such an inclined orientation. When the wastewater 1000 flows over the inclined filter cartridge 100, solids from the wastewater 1000 tend to settle on the upward-facing surfaces of the filter cartridge 100. This kind of filtering is sometimes referred to as "lamella settlement" or "lamella separation" (LAMELLA® is a registered trademark of Parkson Corporation (Fort Lauderdale, FL, USA)). This settling adds to the accumulated solids 1010 on the filter cartridge 100. Some of the settled solids also slide down the filter cartridge 100 by gravity to the bottom of the wastewater treatment tank.

In this manner, the filter cartridge 100 filters the wastewater 1000 by two mechanisms simultaneously. Solids are captured in the first filter media sheet 110 and in the second filter media sheet 115 as the wastewater passes from the outside of the filter cartridge 100 to the interior of the filter cartridge 100. At the same time, solids from the wastewater settle on the upward-facing inclined face of the filter cartridge 100 as the wastewater passes over the filter cartridge 100.

At a low to moderate level, the accumulated solids 1010 actually act as another membrane and aid with filtering by the filter cartridge 100. However, eventually, the accumulated solids 1010 grow to a level that slows the rate at which the filtering occurs. Such a condition can be detected by a corresponding slowing of the filtered water exiting the filtered water outlet 155. If a constant flow of new wastewater is introduced into the wastewater treatment tank during the filtering process, slowed filtering is also indicated by an increase in the level of the wastewater 1000 in the wastewater treatment tank.

A purging (i.e., backwashing) process may then be initiated in the filter cartridge 100 via the purging fluid inlet 160 and the purging fluid hose 310 to help rid the filter cartridge 100 of some portion of the accumulated solids 1010. The purging is performed with the filter cartridge 100 in situ; the filter cartridge 100 remains submerged in the wastewater 1000 during the purging process. The purging fluid may comprise, for example, clean water or compressed air. Clean water may be sourced from a reservoir via a pump, and compressed air may be generated by an air compressor. The purging fluid is directed into the purging fluid inlet 160 via the purging fluid hose 310. The purging fluid travels to the fourth member interior volume 210 and exits the fourth member 195 into the filter interior volume 200 from the purging fluid openings 205.

Figure 18:
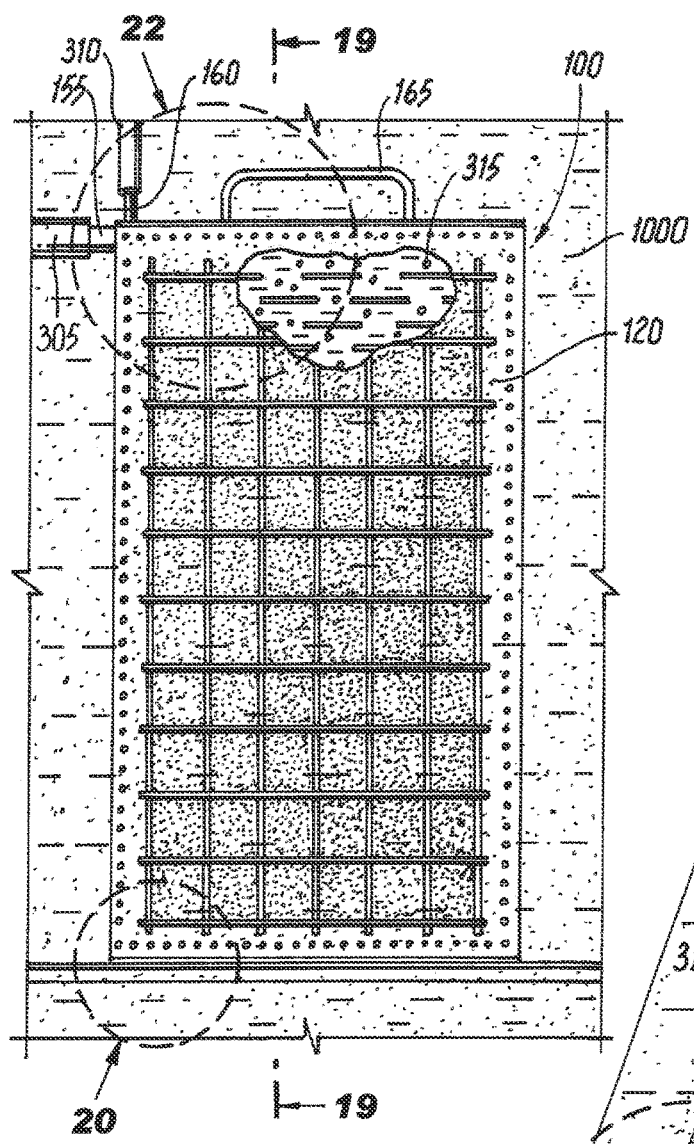
FIG. 18 shows a partially-broken elevational view of the FIG. 1 filter cartridge 100 during purging.
Figure 19:
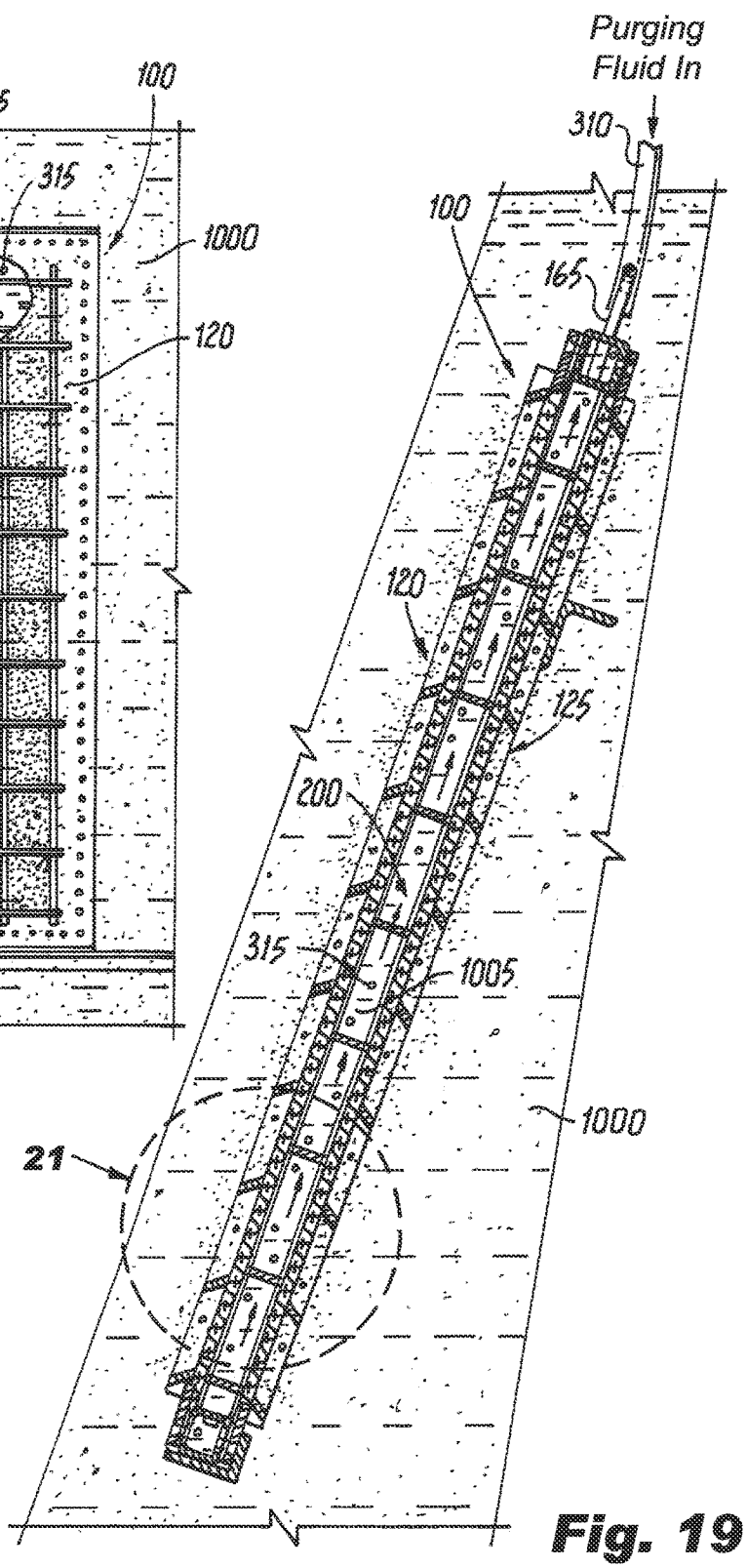
FIG. 19 shows a sectional view of the FIG. 1 filter cartridge during purging along the cleave plane indicated in FIG. 18.
Figure 20:
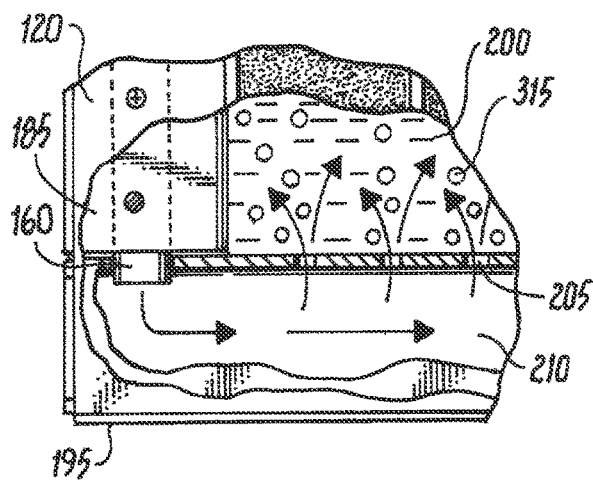
FIG. 20 shows a partially-broken elevational view of the FIG. 1 filter cartridge during purging in the region indicated in FIG. 18.
Figure 21:
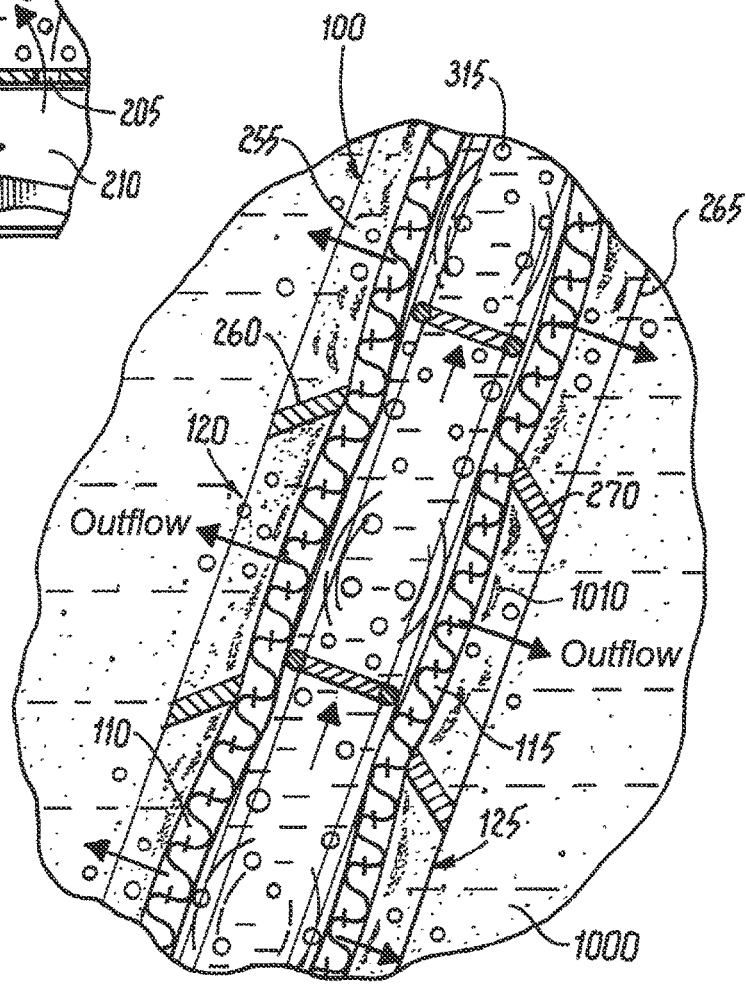
FIG. 21 shows a sectional view of the FIG. 1 filter cartridge during purging in the region indicated in FIG. 19.
Figure 22:
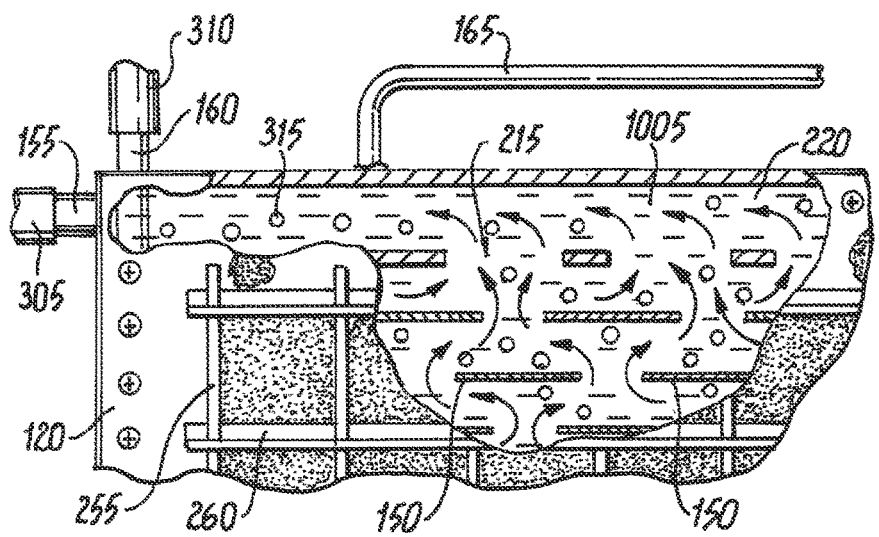
FIG. 22 shows a partially-broken elevational view of the FIG. 1 filter cartridge during purging in the region indicated in FIG. 18.

Compressed air is preferred for purging because it does not add additional liquid volume to the wastewater treatment tank. However, the dynamics occurring while purging the filter cartridge 100 with clean water are largely the same as those described herein for compressed air. FIGS. 18-22 show the filter cartridge 100 submerged in the wastewater 1000 during purging by compressed air. In these figures: FIG. 18 shows a partially-broken elevational view of the filter cartridge 100 during purging, FIG. 19 shows a sectional view of the filter cartridge 100 during purging along the cleave plane indicated in FIG. 18, FIG. 20 shows a partially-broken elevational view of the filter cartridge 100 during purging in the region indicated in FIG. 18, FIG. 21 shows a sectional view of the filter cartridge 100 during purging in the region indicated in FIG. 19, and FIG. 22 shows a partially-broken elevational view of the filter cartridge 100 during purging in the region indicated in FIG. 18.

After leaving the purging fluid openings 205, air bubbles 315 begin to rise in the filter interior volume 200 towards the first member 180. The presence of the compressed air inside the filter interior volume 200 affects the filter cartridge 100 in several ways. Because of the internal baffles 150, the air bubbles 315 cannot proceed straight through the filter interior volume 200, but, instead, take a tortuous path through the filter interior volume 200. This tortuous path and the corresponding turbulence tend to distribute the air bubbles 315 evenly throughout the filter interior volume 200, and, as the air bubbles 315 collide with the internal baffles 150, they also produce vibration, which is transferred to the first filter media sheet 110 and the second filter media sheet 115. Simultaneously, some of the air bubbles 315 escape the filter cartridge 100 by penetrating the first filter media sheet 110 and the second filter media sheet 115 into the surrounding wastewater 1000. Lastly, the higher pressure of the compressed air in the filter interior volume 200 versus that external to the filter cartridge 100 causes the first filter media sheet 110 and second filter media sheet 115 to deflect outward (i.e., bow or balloon) somewhat.

The purging fluid introduced into the purging fluid inlet 160, whether it be compressed air or clean water, thereby cleans the accumulated solids 1010 from the first filter media sheet 110 and the second filter media sheet 115 via at least three mechanisms. The purging fluid produces vibrations that knock off the accumulated solids 1010. The purging fluid penetrates the first filter media sheet 110 and the second filter media sheet 115 in the outward direction, again, forcing the accumulated solids 1010 off of the filter media sheets 110, 115. Lastly, the purging fluid causes the first filter media sheet 110 and the second filter media sheet 115 to deflect outward somewhat with the resultant effect of helping to dislodge the accumulated solids 1010 from the filter media sheets 110, 115.

Purging of the filter cartridge 100 in this manner may be performed at various levels of intensity. While the external hydrostatic pressure acting on the filter cartridge 100 would depend on depth, in one or more illustrative embodiments, the external hydrostatic pressure may be about 17-19 pounds-per-square-inch (psi). Accordingly, internal pressure within the filter interior volume 200 during a lower-intensity clean may be set to achieve an internal pressure of about 25 psi (i.e., 6-8 psi higher than the external hydrostatic pressure). The lower-intensity purging may be purposefully designed to leave some of the accumulated solids 1010 on the filter cartridge 100, allowing that remaining portion to aid with filtering and avoiding turbidity spikes. A higher-intensity purging might utilize an internal pressure closer to about 35 psi (i.e., 16-18 psi higher than the external hydrostatic pressure). If so desired, lower-intensity purging could be performed more often than a higher-intensity purging, with the higher intensity purging occurring, as just one example, once every 3-4 purging cycles. Purging may occur, for example, every two hours, and the purging itself may require about one minute for completion. These numbers are, of course, just by way of example and not intended to limit the scope of the invention.

The first fin assembly 120 with its first straight fins 255 and first angled fins 260, as well as the second fin assembly 125 with its second straight fins 265 and second angled fins 270, perform several functions in the filter cartridge 100 both during active filtration and purging. During filtration, the first angled fins 260 and the second angled fins 270 with their angled orientations deflect settling solids away from the filter cartridge 100. While purging, the first angled fins 260 and the second angled fins 270 also trap purging fluid leaving the filter cartridge 100 so that the purging fluid remains near the first filter media sheet 110 and the second filter media sheet 115 longer, helping to scour these filter media sheets 110, 115 of the accumulated solids 1010. The first straight fins 255, the first angled fins 260, the second straight fins 265, and the second angled fins 270 also prevent the first filter media sheet 110 and second filter media sheet 115 from deflecting (i.e., bowing or ballooning) too much during purging by restricting the deflection to small squares on the first filter media sheet 110 and the second filter media sheet 115. Lastly, the first fin assembly 120 and the second fin assembly 125 in combination with the internal baffles 150 provide additional strength and rigidity to the filter cartridge 100.

In addition to the purging process, the filter cartridge 100 may be cleaned externally by placing them in close proximity to spray panels. The spray panels are designed to receive purging fluid and to emit that purging fluid so that it impinges on the outside of the filter cartridge 100. The impinging fluid aids in externally cleaning the first exterior media surface 235 and the second exterior media surface 245 of the first filter media sheet 110 and the second filter media sheet 115.

Aspects of a spray panel 400 in accordance with an illustrative embodiment are shown in FIGS. 23-25, with: FIG. 23 showing an elevational view of the spray panel 400, FIG. 24 showing an exploded perspective view of the spray panel 400, and FIG. 25 showing an elevational view of the spray panel 400 in the region indicated in FIG. 23. The spray panel 400 has physical dimensions very similar to the filter cartridge 100. The spray panel 400 comprises: a spray panel frame 405, a first spray plate 410, a second spray plate 415, a spray panel handle 420, and a spray panel input 425. The spray panel frame 405 is similar to the peripheral frame 105 of the filter cartridge 100 but does not contain a filtered water outlet like the filtered water outlet 155 in the peripheral frame 105 since the spray panel 400 does not perform a filtering function. The first spray plate 410 and the second spray plate 415 are attached to the spray panel frame 405 in spaced face-to-face relation so that the spray panel frame 405, the first spray plate 410, and the second spray plate 415 combine to define an interior volume within the spray panel 400 (hereinafter, the spray panel interior volume 430). At the same time, in a manner similar to the purging fluid inlet 160 in the filter cartridge 100, the spray panel input 425 travels through the spray panel frame 405 and empties into an interior of the bottommost member of the spray panel frame 405. Spray panel holes 440 in the bottommost member allow the purging fluid from the interior of the bottommost member to enter the spray panel interior volume 430. The spray panel input 425 is thereby in fluid communication with the spray panel interior volume 430.

A given spray panel 400 can be configured to emit purging fluid from one face or from both faces depending on whether that given spray panel 400 is disposed between two filter cartridges 100 or only neighbors a single filter cartridge 100. Accordingly, three iterations of the spray panel 400 are intended, as indicated in FIG. 24: one where the first spray plate 410 is perforated and the second spray plate 415 is blank, one where the first spray plate 410 is blank and the second spray plate 415 is perforated, and one where both the first spray plate 410 and the second spray plate 415 are perforated. Once in the spray panel interior volume 430, the purging fluid exits the first spray plate 410 and/or the the second spray plate 415 through these perforations.

Figure 26:
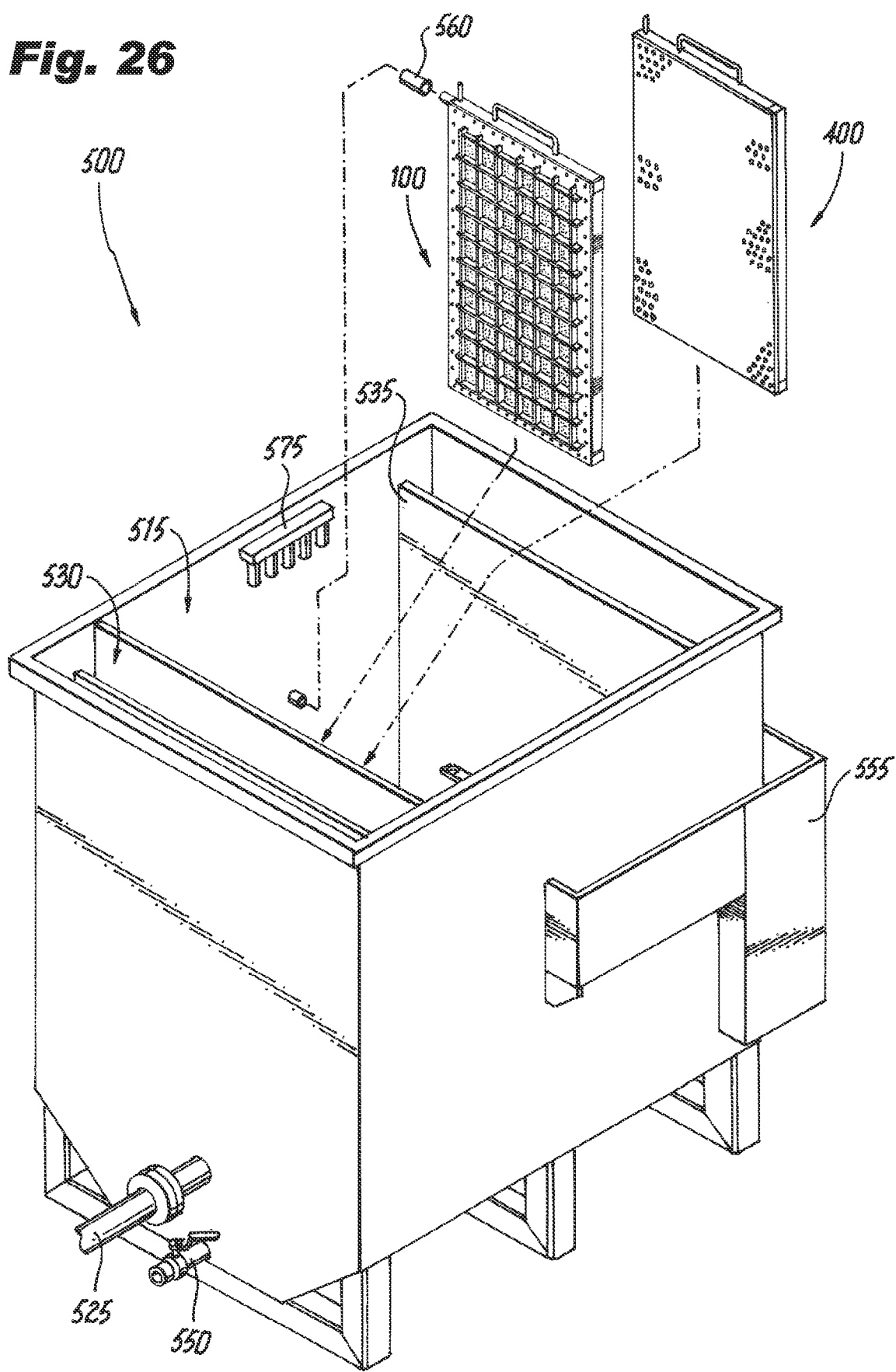
FIG. 26 shows an exploded perspective view of a wastewater filtration system in accordance with an illustrative embodiment of the invention without wastewater present.
Figure 27:
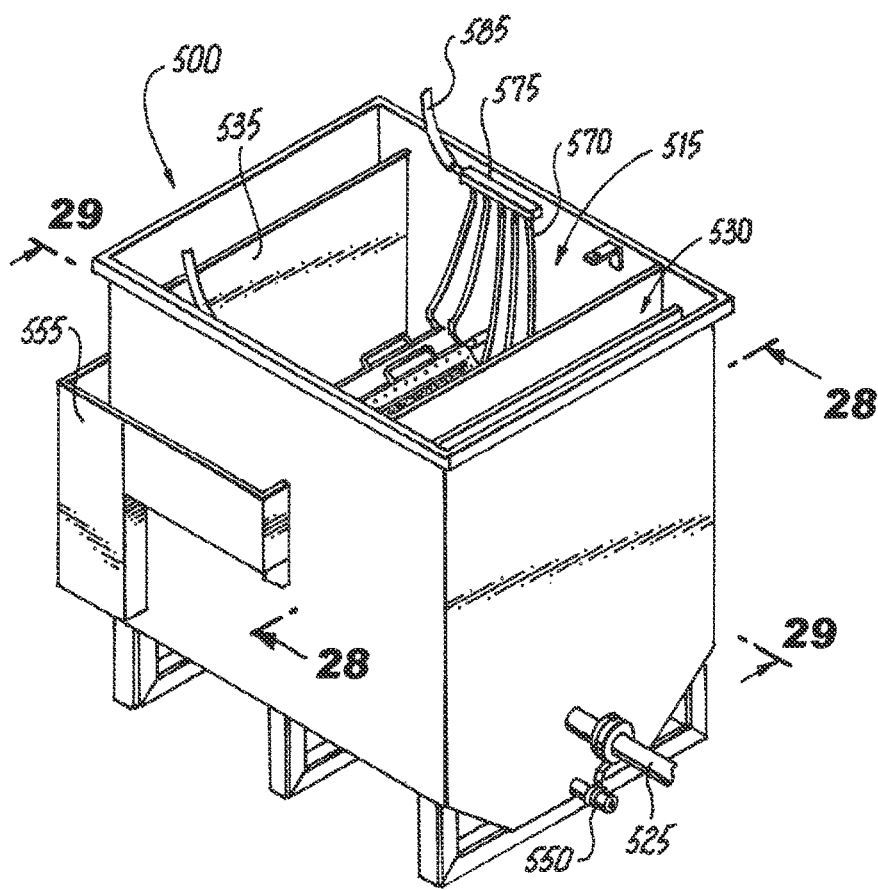
FIG. 27 shows another perspective view of the FIG. 26 wastewater filtration system without wastewater present.
Figure 28:
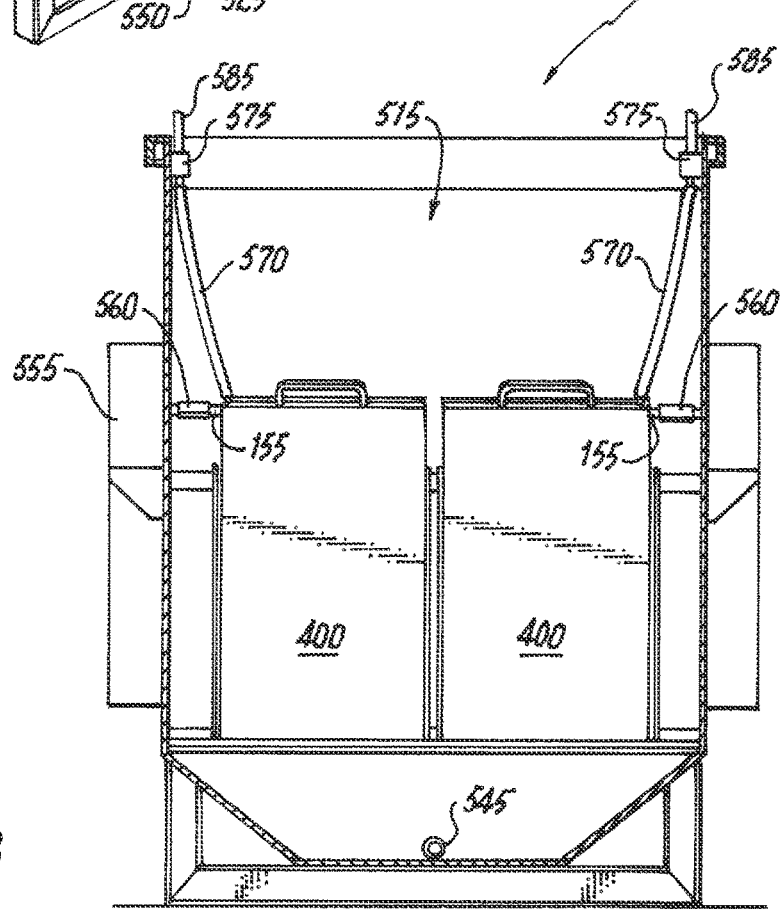
FIGS. 28 and 29 show sectional views of the FIG. 26 wastewater filtration system without wastewater present along the respective cleave planes indicated in FIG. 27.
Figure 29:
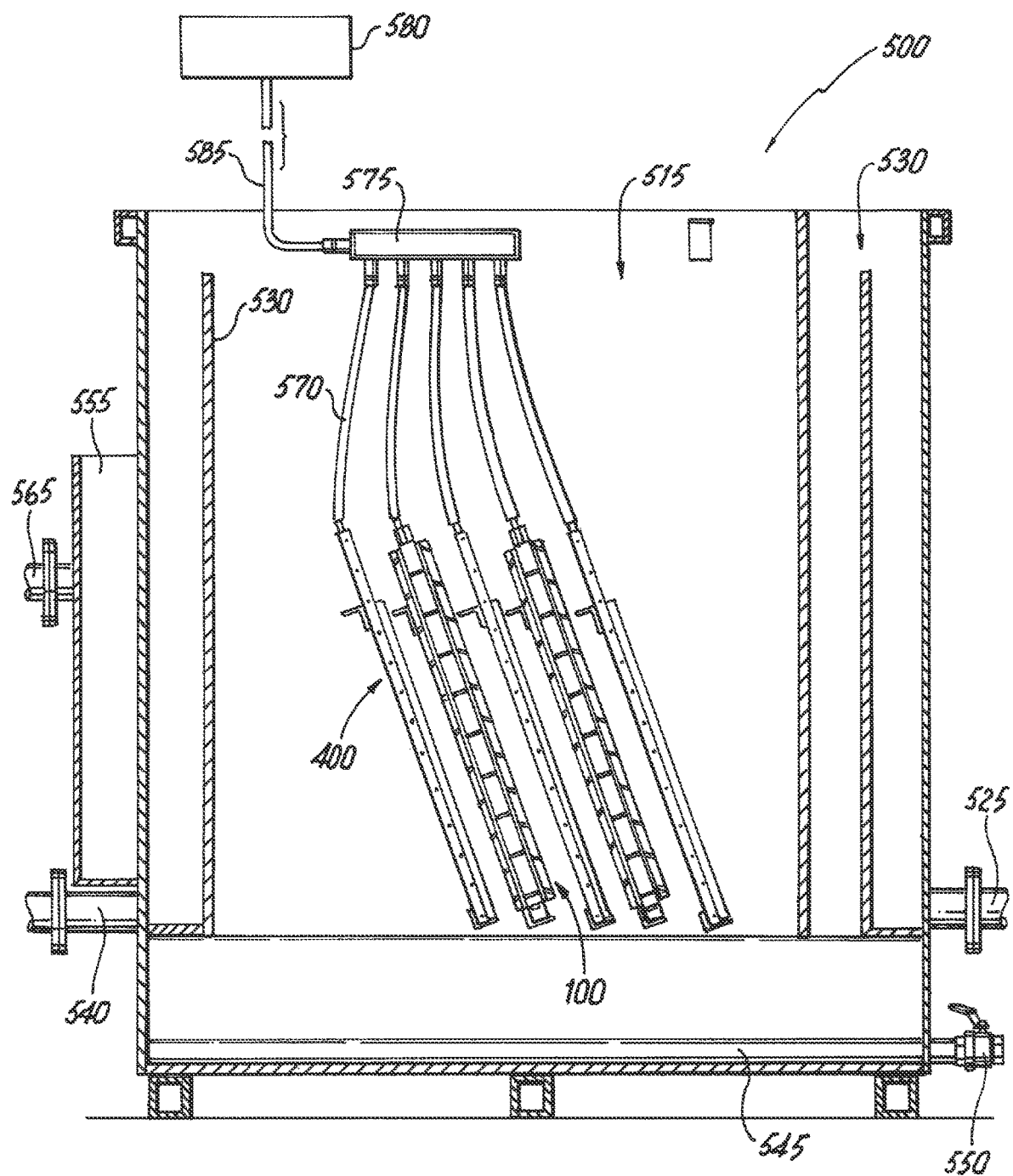

It is contemplated that a plurality of filter cartridges 100 and a plurality of spray panels 400 may be implemented in a given wastewater filtration system so as to achieve the necessary filtering velocity and cleaning efficiency. FIGS. 26-29 show aspects of a wastewater filtration system 500 (a form of apparatus) comprising a plurality of filter cartridges 100 and a plurality of spray panels 400, in accordance with an illustrative embodiment of the invention. FIG. 26 shows an exploded perspective view of the wastewater filtration system 500 without wastewater present, FIG. 27 shows another perspective view of the wastewater filtration system 500 without wastewater present, and FIGS. 28 and 29 show sectional views of the wastewater filtration system 500 without wastewater present along the respective cleave planes indicated in FIG. 27.

In addition to the filter cartridges 100 and the spray panels 400, the wastewater filtration system 500 comprises: a wastewater treatment tank 515, a wastewater input pipe 525, wastewater input barriers 530, a wastewater overflow barrier 535, a wastewater overflow pipe 540, a sludge removal pipe 545, a sludge removal valve 550, a clean water trough 555, clean water transfer hoses/pipes 560, a clean water output pipe 565, purging fluid hoses 570, purging fluid manifolds 575, a purging fluid source 580, and purging fluid source lines 585. Wastewater enters the wastewater treatment tank 515 through the wastewater input pipe 525, where the wastewater is directed toward the bottom of the wastewater treatment tank 515 via the wastewater input barriers 530. There, the wastewater is filtered by the filter cartridges 100. If the wastewater in the wastewater treatment tank 515 gets to a level above the wastewater overflow barrier 535, it is removed from the wastewater treatment tank 515 via the wastewater overflow pipe 540 to avoid overflows. A sludge removal pipe 545 with upward-oriented holes is positioned in the bottom of the wastewater treatment tank 515 and allows sludge to periodically be removed from the bottom of the wastewater treatment tank 515 via the sludge removal valve 550.

In the illustrative wastewater filtration system 500, the filter cartridges 100 and the spray panels 400 are removably mounted in racks in the wastewater treatment tank 515 to form two side-by-side banks of filter cartridges 100 and spray panels 400. This separation into two side-by-side banks allows the widths of the filter cartridges 100 and the spray panels 400 to be reduced. If the filter cartridges 100 and the spray panels 400 were, instead, the full-size width of a tank, they could be prohibitively heavy, particularly when wet. In each bank, the filter cartridges 100 and the spray panels 400 alternate such that each filter cartridge 100 is positioned between, and in close proximity to, two spray panels 400. The distance between a given filter cartridge 100 and a neighboring spray panel 400 in a given bank may be, for example, about two inches. The racks hold the filter cartridges 100 and the spray panels 400 such that they are oriented at an oblique angle with respect to the Earth.

The clean water trough 555 surrounds one end of the wastewater treatment tank 515 of the wastewater filtration system 500. Filtered water from the filtered water outlets 155 of each of the filter cartridges 100 flows into the clean water trough 555 via the clean water transfer hoses/pipes 560. The clean water transfer hoses/pipes 560 penetrate the sidewalls of the wastewater treatment tank 515. Once in the clean water trough 555, the filtered water is collected via the clean water output pipe 565. The filtered water in the clean water trough 555 may also be used as a source of clean water for purging, if so desired. The purging fluid inlets 160 of each of the filter cartridges 100, as well as each of the spray panel inputs 425 of each of the spray panels 400, are attached via the purging fluid hoses 570 to the purging fluid manifolds 575. The purging fluid manifolds 575 are connected to the purging fluid source 580 via purging fluid source lines 585.

Figure 30:
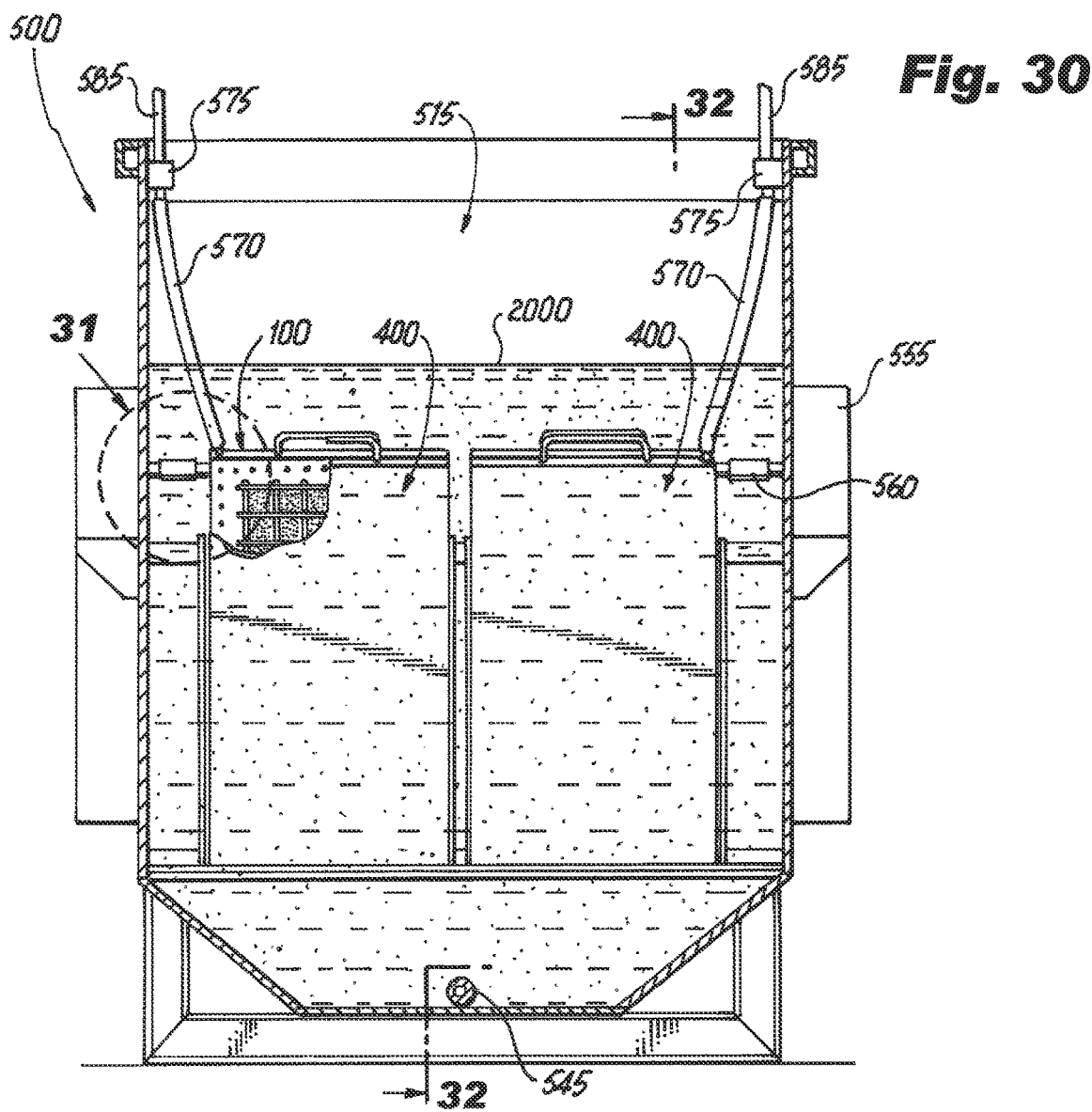
FIG. 30 shows a partially-broken sectional view of the FIG. 26 wastewater filtration system during filtering along the same cleave plane as FIG. 28.
Figure 31:
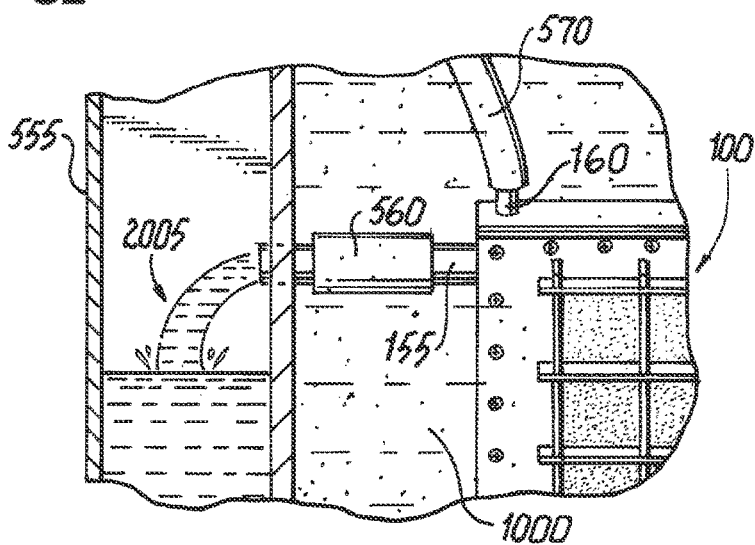
FIG. 31 shows a sectional view of the FIG. 26 wastewater filtration system during filtering in the region indicated in FIG. 30.
Figure 32:
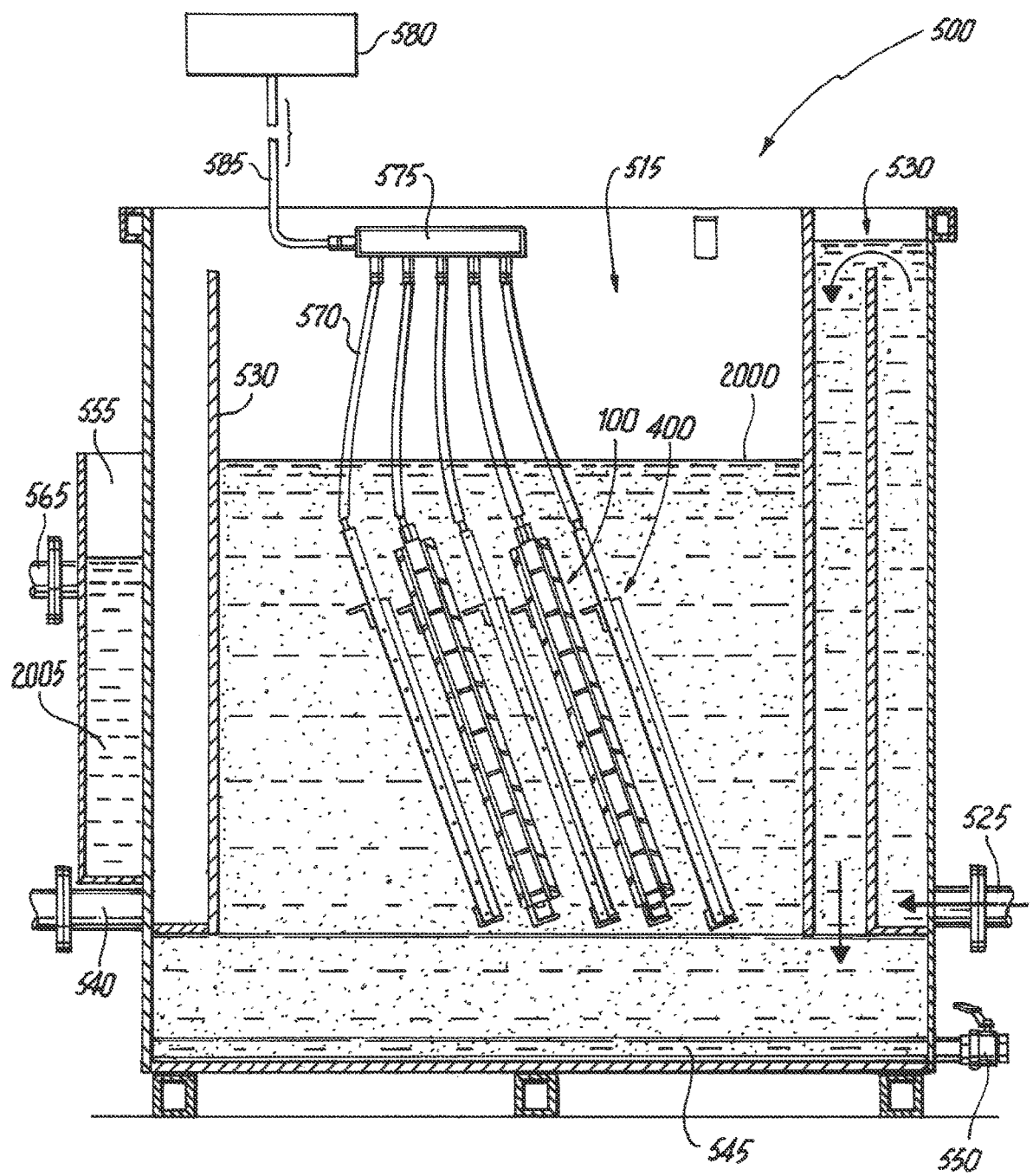
FIG. 32 shows a sectional view of the FIG. 26 wastewater filtration system during filtering along the cleave plane indicated in FIG. 30.

FIGS. 30-32 show aspects of the wastewater filtration system 500 during active filtering of wastewater 2000, with: FIG. 30 showing a partially-broken sectional view of the wastewater filtration system 500 during filtering along the same cleave plane as FIG. 28, FIG. 31 showing a sectional view of the wastewater filtration system 500 during filtering in the region indicated in FIG. 30, and FIG. 32 showing a sectional view of the wastewater filtration system 500 during filtering along the cleave plane indicated in FIG. 30. The wastewater 2000 is preferably introduced into the wastewater treatment tank 515 at a rate that creates a largely quiescent flow across the wastewater treatment tank 515. This gentle flow allows the pressure across all of the filter cartridges 100 to be equal, stops the filter cartridges 100 from being exposed to rushing wastewater 2000, and allows settling solids to settle to the bottom of the wastewater treatment tank 515. Water filtered by the filter cartridges 100 (hereinafter, filtered water 2005) leaves the filter cartridges 100 via their filtered water outlets 155 and enters the clean water trough 555 via the clean water transfer hoses/pipes 560. Eventually, the filtered water 2005 is collected via the clean water output pipe 565. Notably, the respective rate at which filtered water 2005 is produced by each of the filter cartridges 100 in the wastewater filtration system 500 can be individually determined by simply observing the rate at which filtered water 2005 exits each of the filtered water outlets 155. By extension, the respective state of the accumulated solids 2010 on each of the filter cartridges 100 can be individually monitored. A filter cartridge 100 with a slow filtration rate may be removed from the wastewater filtration system 500 and serviced without stopping production by the other filter cartridges 100 in the wastewater filtration system 500.

Figure 33:
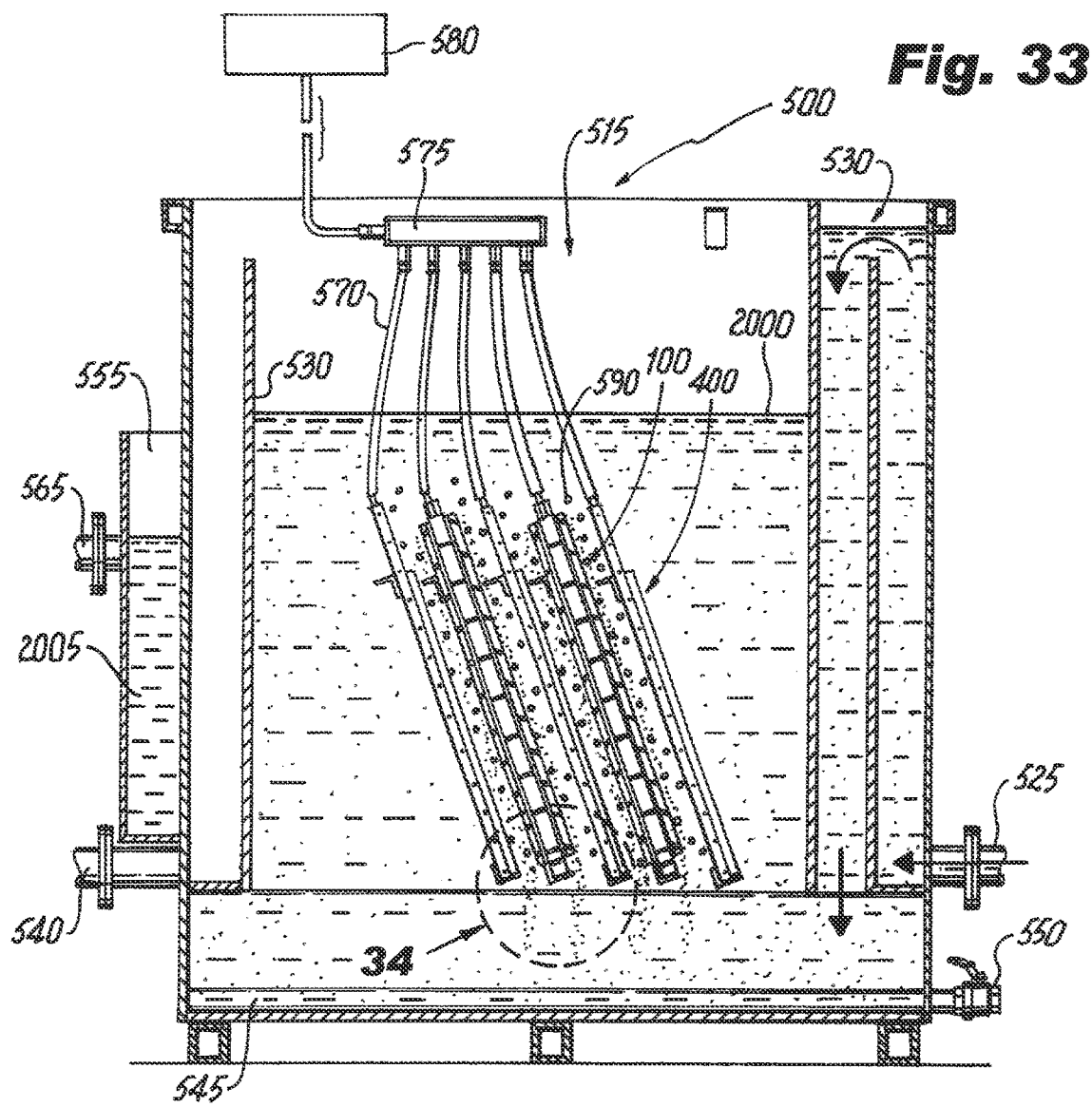
FIG. 33 shows a sectional view of the FIG. 26 wastewater filtration system during external cleaning along the same cleave plane as FIG. 32.
Figure 34:
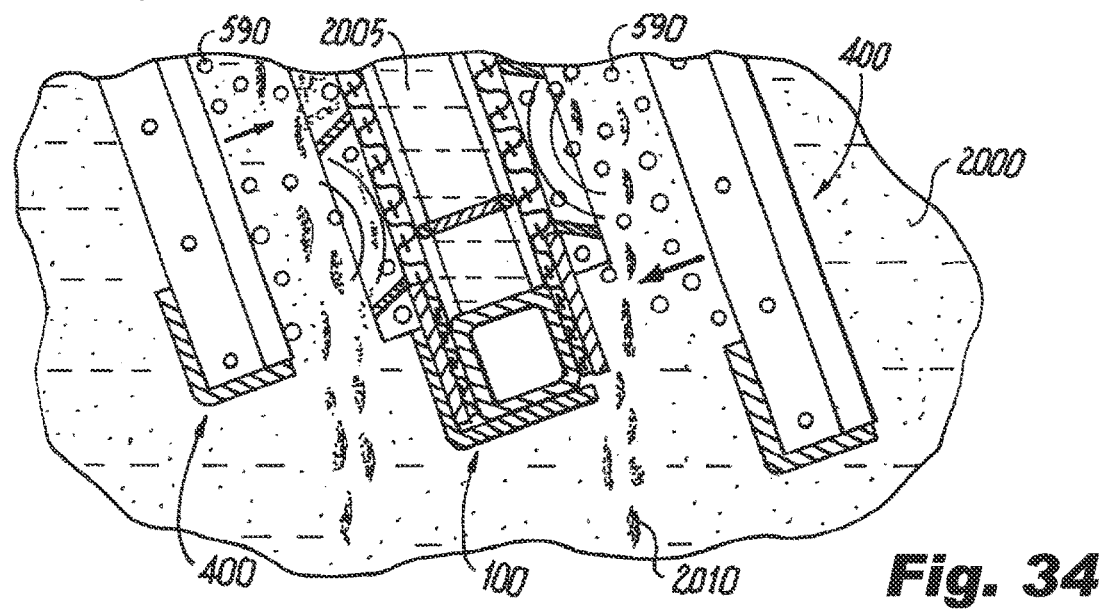
FIG. 34 shows a sectional view of the FIG. 26 wastewater filtration system during external cleaning in the region indicated in FIG. 33.

FIGS. 33 and 34 show aspects of the wastewater filtration system 500 during external cleaning of the filter cartridges 100 by the spray panels 400. FIG. 33 shows a sectional view of the wastewater filtration system 500 during external cleaning along the same cleave plane as FIG. 32, while FIG. 34 shows a sectional view of the wastewater filtration system 500 during external cleaning in the region indicated in FIG. 33. The external cleaning of filter cartridges 100 by the spray panels 400 and the internal purging of the filter cartridges 100 may occur separately or simultaneously. In FIGS. 33 and 34, only the dynamics of cleaning by the spray panels 400 are shown since the dynamics of purging the filter cartridges 100 were described in detail above. As was the case for purging the filter cartridge 100, the purging fluid used by the spray panels 400 may comprise clean water or compressed air. Compressed air is somewhat preferred and that is what is shown in FIGS. 33 and 34.

During the external cleaning, air bubbles 590 leaving the spray panels 400 impinge on the filter cartridges 100, acting to knock off accumulated solids 2010 from the filter cartridges 100. As was the case when purging the filter cartridge 100, the angled fins 260, 270 aid with cleaning. While external cleaning, the angled fins 260, 270 trap the air bubbles 590 so that the air bubbles 590 remain near the first filter media sheet 110 and the second filter media sheet 115 longer, helping to scour these filter media sheets 110, 115 of the accumulated solids 2010. At the same time, the angled fins 260, 270 deflect settling solids away from the filter cartridges 100.

It should again be emphasized that the above-described embodiment of the invention are intended to be illustrative only. Other embodiments can use different types and arrangements of elements for implementing the described functionality. These numerous alternative embodiments within the scope of the appended claims will be apparent to one skilled in the art. The spirit and scope of the appended claims should not be limited solely to the description of the preferred embodiments contained herein.

For example, while the purging and external cleaning of the filter cartridge 100 can be performed manually in the wastewater filtration system 500, technology may be utilized to automate these processes. As the filter cartridges 100 become substantially coated with the accumulated solids 2010, their filtration rate tends to slow and the level of wastewater 2000 in the wastewater treatment tank 515 tends to rise so long as the rate of inflow of the wastewater 2000 into the wastewater treatment tank 515 remains constant. The level of wastewater 2000 in the wastewater treatment tank 515 thereby can become an indicator for the total filtration rate of the filter cartridges 100 in the wastewater filtration system 500.

Figure 35:
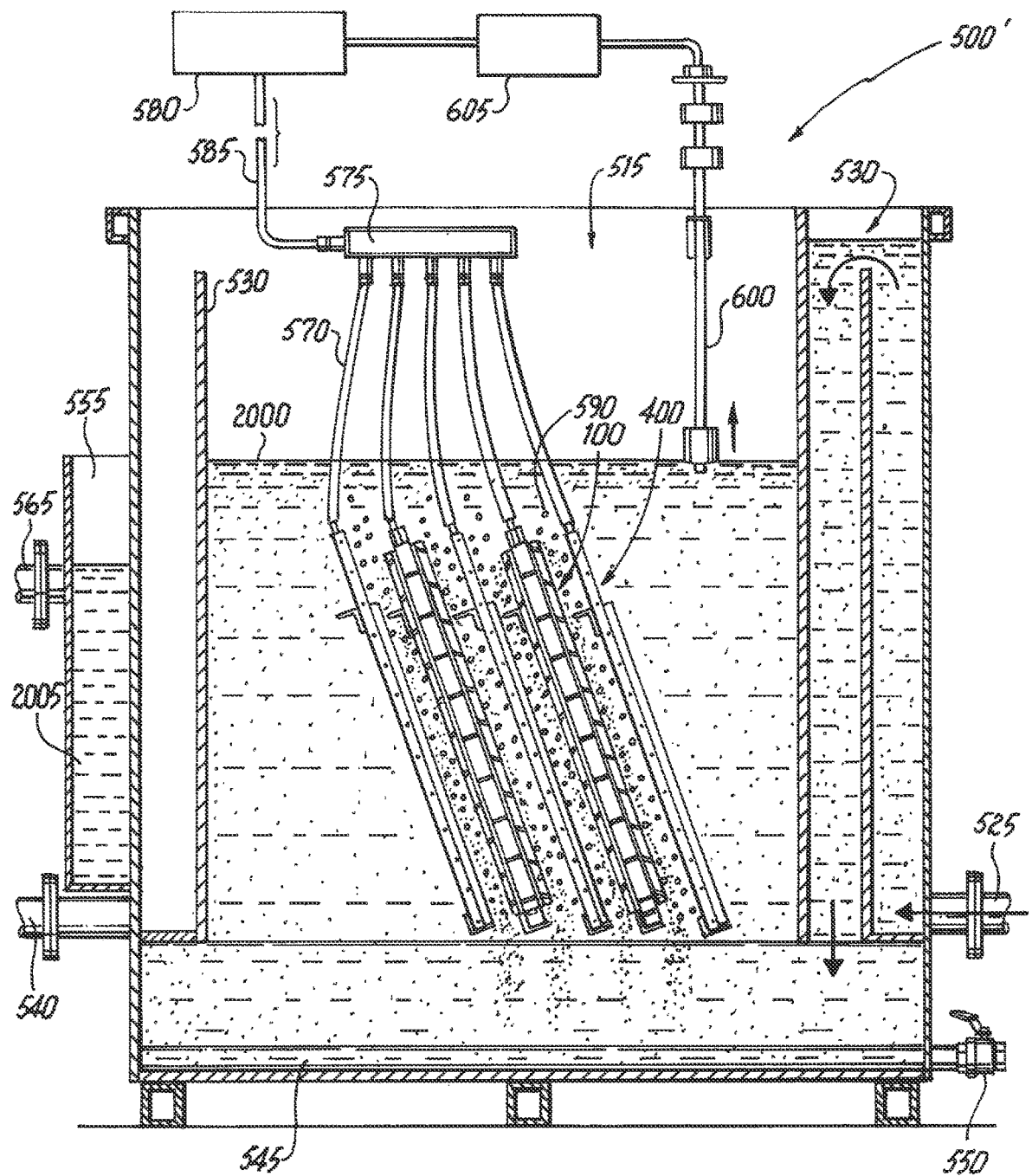
FIG. 35 shows a sectional view of a modified filtration system in accordance with another illustrative embodiment of the invention during filtration along the same cleave plane as FIG. 32.

FIG. 35 shows a sectional view of a modified filtration system 500' in accordance with another illustrative embodiment of the invention during filtration of the wastewater 2000 along the same cleave plane as FIG. 32. The modified filtration system 500' includes many of the same elements as the wastewater filtration system 500, which are labeled with like reference numerals. To aid with automation, the modified filtration system 500' further includes a water level sensor 600 and a controller 605. The water level sensor 600 acts to measure the level of the wastewater 2000 in the wastewater treatment tank 515 of the modified filtration system 500'. The controller 605 reads this water level, and when a predetermined water level is achieved, commands the purging fluid source 580 to send purging fluid to the filter cartridges 100 and to the spray panels 400 so as to activate the purging and external cleaning of the filter cartridges 100. The controller 605 can activate the purging fluid source 580 for a predetermined amount of time, or, alternatively, may activate the purging fluid source 580 until the water level in the wastewater treatment tank 515 starts to drop or reaches a predetermined water level. The controller 605 may comprise, for example, a programmable logic controller (PLC).

In addition, filtering velocity in the wastewater filtration system 500 may be enhanced by the addition of inclined plate settlers or lamella packs in those regions of the wastewater treatment tank 515 not already occupied by the filter cartridges 100 and the spray panels 400. Viewing the wastewater filtration system 500 in FIG. 32, for example, there is space for these additional inclined plates or lamella packs both to the right and left of the filter cartridges 100 and the spray panels 400, particularly if the added elements are shorter than the filter cartridges 100 and the spray panels 400. Suitable lamella packs are commercially available from several vendors, including, as just one example, Parkson Corporation (Fort Lauderdale, FL, USA).

If even greater cleaning capability is desired for the filter cartridges 100 in the wastewater filtration system 500, aeration diffusers may be added to the bottom of the wastewater treatment tank 515. These aeration diffusers may be plumbed to a source of compressed air and made to expel plumes of air bubbles so that the air bubbles impinge on the filter cartridges 100 to further externally clean the filter cartridges 100. Suitable aeration diffusers are commercially available from several vendors, including, for example, SSI Aeration, Inc. (Poughkeepsie, NY, USA).

Lastly, technologies in accordance with aspects of the invention lend themselves to being packaged in cages that can be introduced into existing wastewater treatment tanks. An illustrative cage may comprise, for example, many of the same elements as the wastewater filtration system 500, namely, racks for holding the filter cartridges 100 and the spray panels 400, plumbing for the filtered water, plumbing for the purging fluid, etc. The cage may be fitted with lifting posts and may be raised and lowered by, for example, a gantry.

Aspects of the invention thereby provide several advantages over prior-art designs. The design of the filter cartridge 100, for example:

1. Is robust;
2. Provides a great deal of filtration area per tank volume;
3. May be closely spaced to other filtration cartridges and other filtering elements;
4. May be mounted at an incline to harness lamella settlement as a secondary filtering mechanism;
5. Lends itself to easy placement in, and removal from, a wastewater filtration system without having to halt filtering by other filters in the system;
6. Allows individualized monitoring of filter velocity by having an easily observed and cartridge-specific output of filtered water;
7. Lends itself to various modes of cleaning including internal purging as well as external cleaning by external elements such as spray panels and diffusers;
8. Lends itself to cleaning by modes with low energy consumption and no moving parts to maintain;
9. May be cleaned by a choice of purging fluids such as clean water and compressed air;
10. Lends itself to various intensities of cleaning including those gentle enough to maintain helpful amounts of accumulated solids and avoid turbidity spikes;
11. Lends itself to use in a water filtration system with other types of filters such as inclined plates and/or lamella packs; and
12. Lends itself to incorporation in a wastewater filtration system that only creates a single sludge waste stream to treat.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus comprising:
   a peripheral frame;
   a first filter media sheet attached to the peripheral frame;
   a second filter media sheet attached to the peripheral frame in spaced face-to-face relation to the first filter media sheet such that the peripheral frame, the first filter media sheet, and the second filter media sheet combine to define a filter interior volume with the first filter media sheet having a first exterior media surface facing away from the filter interior volume and a first interior media surface facing towards the filter interior volume, and with the second filter media sheet having a second exterior media surface facing away from the filter interior volume and a second interior media surface facing towards the filter interior volume;
   a grid of first fins attached to the peripheral frame external to the filter interior volume, a portion of the grid of first fins and projecting away from the first exterior media surface at an oblique angle;
   a grid of second fins attached to the peripheral frame external to the filter interior volume, a portion of the grid of second fins and projecting away from the second exterior media surface at an oblique angle; and
   a filtered water outlet in fluid communication with the filter interior volume.

2. The apparatus of claim 1, wherein the peripheral frame comprises a first member, a second member, a third member, and a fourth member arranged as a quadrilateral.

3. The apparatus of claim 2, wherein:
   the fourth member comprises a plurality of purge fluid openings providing fluid communication between an interior of the fourth member and the filter interior volume; and
   the first member comprises a plurality of filtered water openings providing fluid communication between an interior of the first member and the filter interior volume.

4. The apparatus of claim 3, wherein the filtered water outlet projects from the first member and is in fluid communication with the interior of the first member.

5. The apparatus of claim 2, further comprising a purging fluid inlet in fluid communication with the filter interior volume.

6. The apparatus of claim 5, wherein the purging fluid inlet projects from the first member.

7. The apparatus of claim 5, wherein the purging fluid inlet is in fluid communication with an interior of the fourth member.

8. The apparatus of claim 1, where the first filter media sheet and the second filter media sheet comprise pile cloth.

9. The apparatus of claim 1, wherein:
   the apparatus further comprises:
      a first inner mesh; and
      a second inner mesh;
   the first interior media surface overlies the first inner mesh; and
   the second interior media surface overlies the second inner mesh.

10. The apparatus of claim 9, further comprising a plurality of internal baffles spanning between the first inner mesh and the second inner mesh in the filter interior volume.

11. An apparatus comprising:
    a wastewater treatment tank;
    wastewater in the wastewater treatment tank; and
    a filter cartridge mounted in the wastewater treatment tank, submerged in the wastewater, and comprising:
       a peripheral frame;
       a first filter media sheet attached to the peripheral frame;
       a second filter media sheet attached to the peripheral frame in spaced face-to-face relation to the first filter media sheet such that the peripheral frame, the first filter media sheet, and the second filter media sheet combine to define a filter interior volume with the first filter media sheet having a first exterior media surface facing away from the filter interior volume and a first interior media surface facing towards the filter interior volume, and with the second filter media sheet having a second exterior media surface facing away from the filter interior volume and a second interior media surface facing towards the filter interior volume;
       a grid of first fins attached to the peripheral frame external to the filter interior volume, a portion of the grid of first fins and projecting away from the first exterior media surface at an oblique angle;

a grid of second fins attached to the peripheral frame external to the filter interior volume, a portion of the grid of second fins and projecting away from the second exterior media surface at an oblique angle; and a filtered water outlet in fluid communication with the filter interior volume.

12. The apparatus of claim 11, wherein the filter cartridge is mounted in the wastewater treatment tank with the first exterior media surface and the second exterior media surface forming an oblique angle with respect to the Earth.

13. The apparatus of claim 11, wherein a filtered portion of the wastewater penetrates the first filter media sheet or the second filter media sheet into the filter interior volume.

14. The apparatus of claim 13, wherein the filtered portion of the wastewater has a lower solids content than a remainder of the wastewater external to the filter interior volume.

15. The apparatus of claim 13, wherein the filtered portion of the wastewater in the filter interior volume exits the filter cartridge through the filtered water outlet.

16. The apparatus of claim 13, wherein:

the filter cartridge further comprises a purging fluid inlet in fluid communication with the filter interior volume; and collected solids can be removed from the first filter media sheet and the second filter media sheet by introducing purging fluid into the purging fluid inlet.

17. The apparatus of claim 16, wherein the purging fluid comprises water or compressed air.

18. The apparatus of claim 11, further comprising a spray panel mounted in the wastewater treatment tank and comprising:

a spray panel frame;

a first spray plate attached to the spray panel frame; and a second spray plate attached to the spray panel frame; wherein:

the spray panel frame, the first spray plate, and the second spray plate combine to define a spray panel interior volume; and the first spray plate and/or the second spray plate are perforated.

19. The apparatus of claim 18, wherein the spray panel further comprises a spray panel input in fluid communication with the spray panel interior volume.

20. The apparatus of claim 19, further comprising a source of purging fluid delivering purging fluid to the spray panel input.

21. The apparatus of claim 20, wherein at least a portion of the purging fluid delivered to the spray panel input is emitted by the spray panel and impinges on the filter cartridge.

22. The apparatus of claim 18, wherein the spray panel is mounted in the wastewater treatment tank with the first spray plate and the second spray plate oriented at an oblique angle with respect to the Earth.

\* \* \* \* \*